(12) United States Patent
Tanaka et al.

(10) Patent No.: US 9,840,269 B2
(45) Date of Patent: Dec. 12, 2017

(54) STEERING SYSTEM

(71) Applicant: JTEKT CORPORATION, Osaka-shi, Osaka (JP)

(72) Inventors: Hidenobu Tanaka, Shiki-gun (JP); Hiromitsu Tomiyama, Kashihara (JP); Masayuki Nagaoka, Kashiba (JP); Yoshihito Yoshihara, Kashihara (JP)

(73) Assignee: JTEKT CORPORATION, Osaka-shi (JP)

(*) Notice: Subject to any disclaimer, the term of this patent is extended or adjusted under 35 U.S.C. 154(b) by 26 days.

(21) Appl. No.: 15/200,804

(22) Filed: Jul. 1, 2016

(65) Prior Publication Data
US 2017/0008546 A1  Jan. 12, 2017

(30) Foreign Application Priority Data

Jul. 8, 2015 (JP) ................. 2015-137045
Mar. 17, 2016 (JP) ................. 2016-053958

(51) Int. Cl.
*B62D 1/184* (2006.01)
*B62D 1/189* (2006.01)

(52) U.S. Cl.
CPC ............ *B62D 1/184* (2013.01); *B62D 1/189* (2013.01)

(58) Field of Classification Search
CPC ........ B62D 1/184; B62D 1/187; B62D 1/189; B62D 1/18
USPC .......................................... 74/493; 280/775
See application file for complete search history.

(56) References Cited

U.S. PATENT DOCUMENTS

| 4,732,050 A | * | 3/1988 | Vollmer | B62D 1/184 280/775 |
| 5,338,064 A | * | 8/1994 | Sadakata | B62D 1/184 280/775 |
| 5,722,299 A | * | 3/1998 | Yamamoto | B62D 1/184 280/775 |
| 5,743,150 A | * | 4/1998 | Fevre | B62D 1/184 280/775 |

(Continued)

FOREIGN PATENT DOCUMENTS

| EP | 1894812 A1 | * | 3/2008 | ............ B62D 1/184 |
| JP | 2007083852 A | * | 4/2007 | |

(Continued)

OTHER PUBLICATIONS

Apr. 18, 2017 Search Report issued in European Patent Application No. 16177982.2.

*Primary Examiner* — Keith J Frisby
(74) *Attorney, Agent, or Firm* — Oliff PLC

(57) ABSTRACT

A steering system includes an insertion shaft that is movable in a tilt direction C along with a column jacket, a first tooth member including a plurality of first teeth aligned along a first linear direction, and a second tooth member including a plurality of second teeth aligned along the first linear direction. A first restriction portion restricts movement of the first tooth member in the first linear direction with respect to an upper bracket. A second restriction portion is movable in the first linear direction and immovable in a second linear direction, with respect to a linear slot in the first tooth member that extends along the first linear direction. The second restriction portion restricts movement of the second tooth member in the second linear direction with respect to the first tooth member.

9 Claims, 17 Drawing Sheets

(56) References Cited

U.S. PATENT DOCUMENTS

| | | | | |
|---|---|---|---|---|
| 5,787,759 | A | * | 8/1998 | Olgren .................. B62D 1/184 280/777 |
| 6,092,957 | A | * | 7/2000 | Fevre .................... B62D 1/184 280/775 |
| 2004/0261565 | A1 | * | 12/2004 | Uphaus ................. B62D 1/184 74/493 |
| 2008/0178702 | A1 | * | 7/2008 | Lutz ...................... B62D 1/184 74/493 |
| 2009/0013187 | A1 | | 1/2009 | Steinberg |
| 2009/0013817 | A1 | | 1/2009 | Schnitzer et al. |
| 2014/0096638 | A1 | * | 4/2014 | Buzzard ................ B62D 1/184 74/493 |
| 2014/0196564 | A1 | * | 7/2014 | Bang ..................... B62D 1/187 74/493 |

FOREIGN PATENT DOCUMENTS

| | | | | |
|---|---|---|---|---|
| JP | 2008308034 | A | * 12/2008 | |
| JP | 2010269629 | A | * 12/2010 | |
| WO | WO-2009047516 | A1 | * 4/2009 | ............. B62D 1/184 |

* cited by examiner

STEERING SYSTEM

INCORPORATION BY REFERENCE

The disclosure of Japanese Patent Applications No. 2015-137045 filed on Jul. 8, 2015 and No. 2016-053958 filed on Mar. 17, 2016 including the specification, drawings and abstract, is incorporated herein by reference in its entirety.

BACKGROUND OF THE INVENTION

1. Field of the Invention

The invention relates to a steering system.

2. Description of the Related Art

A steering column described in U.S. Patent Application No. 2009/0013817 (US 2009/0013817 A) includes an adjustment portion and a holding portion that is fixed in position in an adjustment direction. The adjustment portion can adjust the position of the steering column. The holding portion does not move in an adjustment direction for the steering column in accordance with the positional adjustment of the steering column. To the adjustment portion, a jacket unit is attached which holds the steering shaft. A slot formed in the holding portion extends along the adjustment direction. Teeth aligned along the adjustment direction are provided on the holding portion. A clamp bolt inserted through the slot in the holding portion penetrates a tooth plate. The tooth plate has teeth aligned in the adjustment direction.

Operating an operation member attached to the clamp bolt enables a pressing member through which the clamp bolt is inserted to be moved toward the holding portion. Moving the pressing member toward the holding portion allows the tooth plate to be pressed by the pressing member and moved toward the holding portion. At that time, the tooth portions of the tooth plate move into spaces between the tooth portions of the holding portion and mesh with the tooth portions of the holding portion. Consequently, the jacket unit is fixed in position in the adjustment direction.

In the steering column in US 2009/0013817 A, the adjustment direction is a direction along a circular arc around a turning shaft provided in a bracket fixed to a chassis of the vehicle, that is, what is called a tilt direction. A distance between the turning shaft and the slot is set according to a vehicle type. Thus, even a slight difference in the distance according to the vehicle type leads to a change in the curvature of the circular arc. The change in the curvature of the circular arc requires changing not only the shape of the slot in the holding portion but also the shape and pitch of the tooth portions aligned in the holding portion and the tooth plate along the adjustment direction. This hinders the use of a common configuration adapted to fix the column jacket in position in the adjustment direction by meshing the teeth with one another.

SUMMARY OF THE INVENTION

An object of the invention is to provide a steering system in which a common configuration is adopted which allows fixing a column jacket in position in a tilt direction by supporting a steering shaft by the column jacket and meshing teeth with one another.

According to an aspect of the invention, a steering system includes: a steering shaft with a steering member coupled to the steering shaft at one end thereof; a column jacket that holds the steering shaft and that is enabled to pivot in a tilt direction along a trajectory shaped like a circular arc with a predetermined curvature; a bracket that supports the column jacket so as to enable the column jacket to pivot and that is fixed to a vehicle body; an insertion shaft to which an operation member operated to enable and disable movement of the column jacket with respect to the bracket is attached, the insertion shaft extending in a crossing direction that crosses both an axial direction of the steering shaft and the tilt direction and being movable in the tilt direction along with the column jacket; a first tooth member in which a linear slot extending in a first linear direction that crosses the axial direction and that is orthogonal to the crossing direction is formed, the first tooth member including a first tooth row including a plurality of first teeth aligned along the first linear direction, the first tooth member supported by the bracket so as to be movable in a second linear direction that crosses the first linear direction and that is orthogonal to the crossing direction; a first restriction portion provided on the bracket to restrict movement of the first tooth member in the first linear direction with respect to the bracket; a second tooth member including a second tooth row including a plurality of second teeth aligned along the first linear direction, the second tooth member facing the first tooth member in the crossing direction and supported by the insertion shaft, the second tooth member being enabled to move in the crossing direction as a result of an operation of the operation member, and a second restriction member coupled to the second tooth member and inserted through the linear slot so as to be movable in the first linear direction with respect to the linear slot and to be immovable in the second linear direction with respect to the linear slot, the second restriction member restricting movement of the second tooth member in the second linear direction with respect to the first tooth member.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
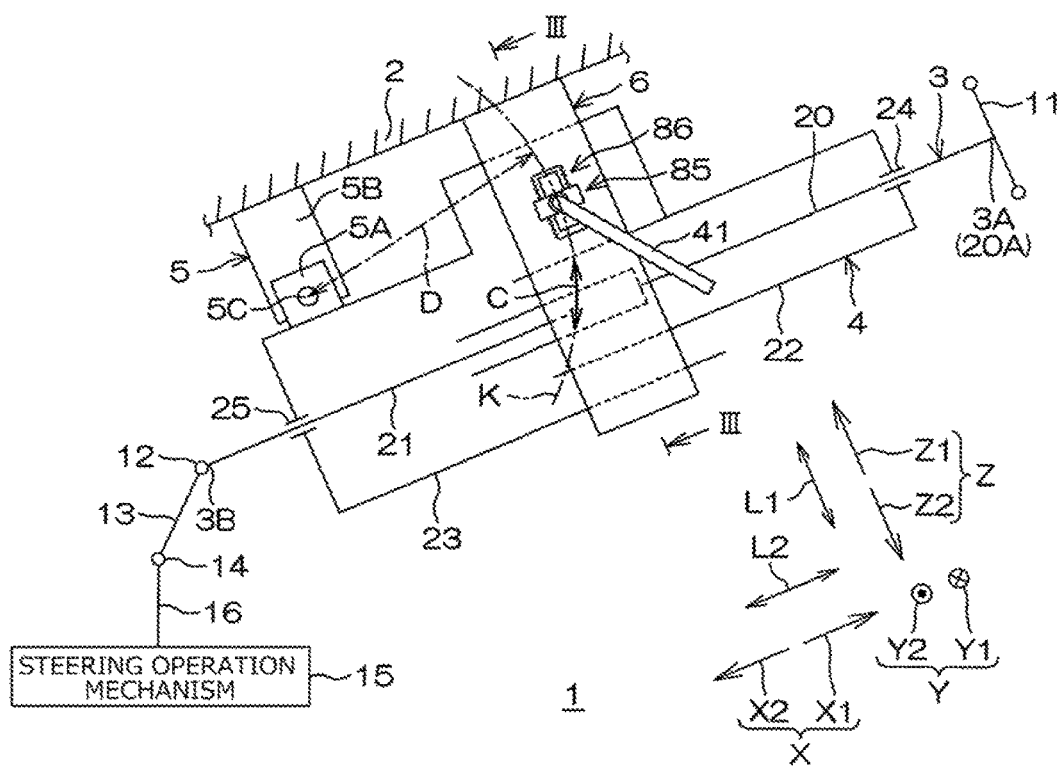
FIG. 1 is a side view schematically depicting a configuration of a steering system according to a first embodiment of the invention.

An embodiment of the invention will be described below in detail with reference to the attached drawings. FIG. 1 schematically depicts a configuration of a steering system 1 according to a first embodiment of the invention. In FIG. 1, a left side of the drawing plane corresponds to a front side of a vehicle body 2 to which the steering system 1 is attached, a right side of the drawing plane corresponds to a rear side of the vehicle body 2, an upper side of the drawing plane corresponds to an upper side of the vehicle body 2, and a lower side of drawing plane corresponds to a lower side of the vehicle body 2.

As seen in FIG. 1, the steering system 1 includes, as main components, a steering shaft 3, a column jacket 4, a lower bracket 5, an upper bracket 6 (bracket). A steering member 11 is coupled to an end 3A of the steering shaft 3, which is a rear end. The other end 3B of the steering shaft 3, which is a front end, is coupled to a pinion shaft 16 of a steering operation mechanism 15 via a universal joint 12, an intermediate shaft 13, and a universal joint 14 in this order.

The steering operation mechanism 15 includes a rack-and-pinion mechanism. The steering operation mechanism 15 steers steered wheels such as tires not depicted in the drawings, in accordance with rotation of the steering shaft 3 transmitted to the steering operation mechanism 15. The steering shaft 3 extends in a front-rear direction of the vehicle body 2. A direction in which the steering shaft 3 extends is hereinafter referred to as an axial direction X. The axial direction X is inclined to a horizontal direction such that the other end 3B located lower than the end 3A. A rear side in the axial direction X is denoted by reference character "X1". A front side in the axial direction X is denoted by reference character "X2".

Of directions that cross the axial direction X, a direction perpendicular to the drawing sheet of FIG. 1 is referred to as a lateral direction Y (crossing direction), and a direction that is orthogonal to the axial direction X and that extends substantially in an up-down direction in FIG. 1 is referred as an up-down direction Z. In the lateral direction Y, a side facing away from the viewer in the sheet of FIG. 1 is a right side Y1, and a side facing the viewer in FIG. 1 is a left side Y2. In the up-down direction Z, an upper side is denoted by reference character "Z1", and a lower side is denoted by reference character "Z2". In the figures other than FIG. 1, directions that correspond to the following directions are denoted by the same reference characters as those in FIG. 1: the axial direction X, the rear side X1, the front side X2, the lateral direction Y, the right side Y1, the left side Y2, the up-down direction Z, the upper side Z1, and the lower side Z2.

The steering shaft 3 includes an upper shaft 20 that is cylindrical at least at a part of the front side X2 of the upper shaft and a columnar lower shaft 21. The upper shaft 20 is disposed on the rear side X1 with respect to the lower shaft 21 and coaxially with the lower shaft 21. A rear end 20A of the upper shaft 20 is the end 3A of the steering shaft 3. A rear end portion of the lower shaft 21 is inserted into a front end portion of the upper shaft 20 from the front side X2. The lower shaft 21 is fitted into the upper shaft 20 by spline fitting or serration fitting. Thus, the upper shaft 20 and the lower shaft 21 are integrally rotatable and movable relative to each other along the axial direction X. The steering shaft 3 can be extended and contracted in the axial direction X by moving the upper shaft 20 with respect to the lower shaft 21 in the axial direction X.

The column jacket 4 is generally a hollow member extending in the axial direction X. The column jacket 4 houses the steering shaft 3. The column jacket 4 has a tubular upper jacket 22 and a lower jacket 23 that extend in the axial direction X. The upper jacket 22 is positioned on the rear side X1 with respect to the lower jacket 23. The lower jacket 23 is externally fitted over the upper jacket 22 from the front side X2. In this state, the upper jacket 22 is movable with respect to the lower jacket 23 in the axial direction X. This movement enables the whole column jacket 4 to be extended and contracted along the axial direction X.

The column jacket 4 is coupled to the steering shaft 3 via a bearing 24 and a bearing 25. Consequently, the column jacket 4 supports the steering shaft 3 so that the steering shaft 3 is rotatable, and holds the steering shaft 3. The column jacket 4 can be extended and contracted along with the steering shaft 3. The extension and contraction of the steering shaft 3 and the column jacket 4 as used herein are referred to as "telescopic" operations. Extension and contraction adjustment, in other words, telescopic positional adjustment of the steering member 11 in the axial direction X, is referred to as telescopic adjustment.

The lower bracket 5 supports a front side X2 portion of the lower jacket 23 to couple the steering system 1 to the vehicle body 2. The lower bracket 5 includes a pair of movable brackets 5A, a fixed bracket 5B, and a central shaft 5C. The movable brackets 5A are fixed to the lower jacket 23. The fixed bracket 5B is fixed to the vehicle body 2. The central shaft 5C extends in the lateral direction Y.

The movable brackets 5A are supported by the fixed bracket 5B so as to be able to pivot via the central shaft 5C such as a column hinge. Thus, in conjunction with the steering shaft 3, the column jacket 4 as a whole can pivot upward and downward around the central shaft 5C with respect to the fixed bracket 5B and the upper bracket 6. The pivoting as used herein is referred to as "tilt", and a substantial up-down direction around the central shaft 5C is referred to as a tilt direction C. The tilt direction C extends along a trajectory K shaped like a circular arc with a predetermined curvature. The tilt direction C extends upward and downward so as to cross the axial direction X. The tilt direction C is orthogonal to the lateral direction Y. The positional adjustment of the steering member 11 based on tilting is referred to as tilt adjustment.

Figure 2:
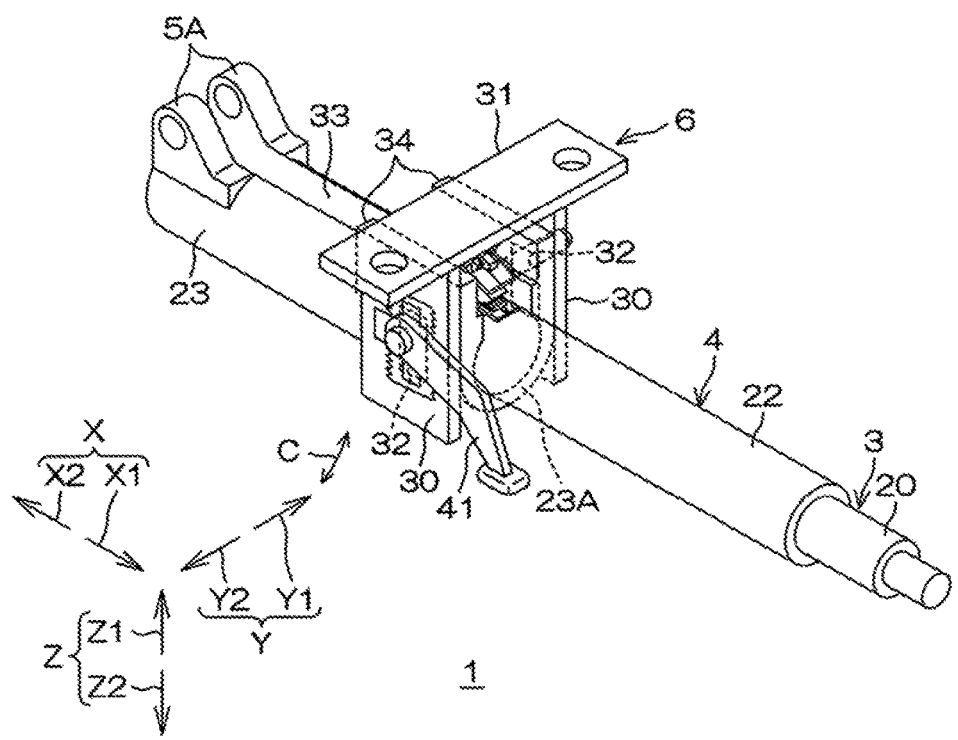
FIG. 2 is a perspective view of the steering system.

The upper bracket 6 supports a rear side X1 portion of the lower jacket 23 of the column jacket 4 to couple the steering system 1 to the vehicle body 2. As seen in FIG. 2 that is a perspective view of the steering system 1, the upper bracket 6 is shaped like a groove that is open downward and is formed laterally symmetrically with respect to the column jacket 4 so as to appear like a general inverted U-shape as viewed in the axial direction X. Specifically, the upper bracket 6 integrally includes a pair of side plates 30 and a coupling plate 31 that is thin in the up-down direction Z. The side plates 30 are thin in the lateral direction Y and opposed to each other with the column jacket 4 located therebetween. The coupling plate 31 is coupled to an upper end of each of the side plates 30.

The coupling plate 31 has portions that extend outward beyond the respective side plates 30 in the lateral direction Y. Bolts or the like not depicted in the drawings are inserted through the extending portions of the coupling plate 31 so that the whole upper bracket 6 is fixed to the vehicle body 2 (see FIG. 1). In an upper side Z1 portion of the lower jacket 23, a slit 33 is formed which extends all along the lower jacket 23 in the axial direction X so as to penetrate the lower jacket 23 in the up-down direction Z. At a rear end portion 23A of the lower jacket 23, a pair of clamped portions 34 is integrally provided which extends toward the upper side Z1 while defining the slit 33 in the lateral direction Y. Each of the clamped portions 34 is generally a rectangular parallelepiped extending in the axial direction X and the up-down direction Z.

Figure 3:
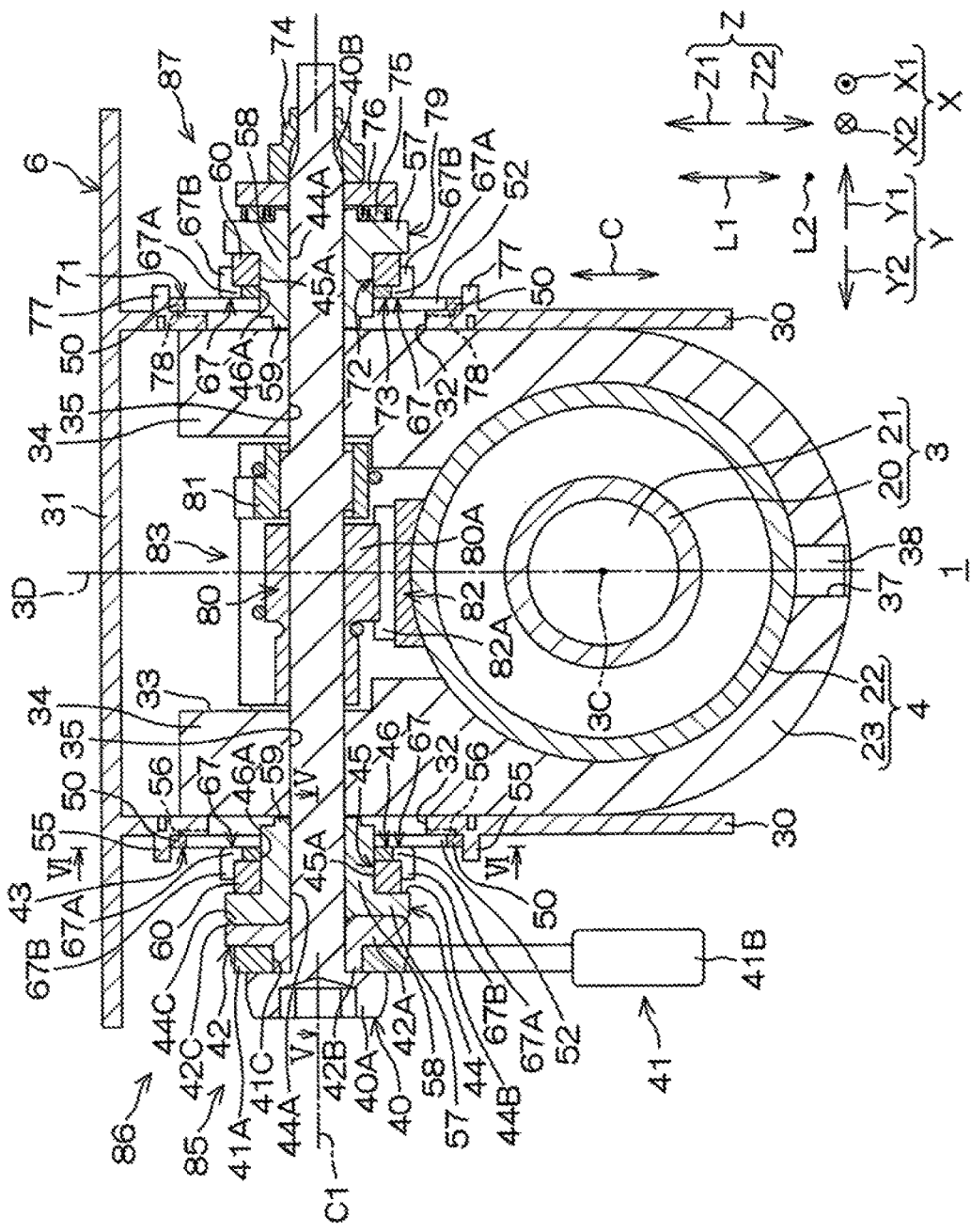
FIG. 3 is a sectional view taken along the line III-III in FIG. 1.

FIG. 3 is a sectional view taken along the line III-III in FIG. 1. In FIG. 3, a plane extending in the up-down direction Z through a central axis 3C of the steering shaft 3 is referred to as a reference plane 3D. As seen in FIG. 3, an insertion hole 32 shaped like a rectangle that is longitudinal in the up-down direction Z is formed in each of the side plates 30 such that the insertion holes 32 are at the same position as viewed in the lateral direction Y. In each of the clamped portions 34, a shaft insertion hole 35 is formed which penetrates the clamped portion 34 in the lateral direction Y.

In a lower side Z2 portion of the lower jacket 23, a guide groove 37 is formed which extends in the axial direction X. A guided protrusion 38 fixed to the upper jacket 22 is inserted through the guide groove 37. The guide groove 37 restricts rotation of the upper jacket 22 with respect to the lower jacket 23 while guiding, via the guided protrusion 38, movement of the upper jacket 22 in the axial direction X. An end of the guide groove 37 in the axial direction X comes into abutting contact with the guided protrusion 38 to prevent the upper jacket 22 from slipping out from the lower jacket 23.

The steering system 1 further includes an insertion shaft 40, an operation member 41, a cam 42, a first tooth member 43, a clamping member 44, second tooth member 45, and an elastic member 46. The operation member 41 is disposed near the left-side-Y2 side plates 30. The insertion shaft 40 is formed of metal and shaped like a rod having a central axis C1 extending in the lateral direction Y. The insertion shaft 40 is also referred to as a tilt bolt. The insertion shaft 40 is inserted through an area where each shaft insertion hole 35 and the corresponding insertion hole 32 overlap as viewed in the lateral direction Y. Specifically, the insertion shaft 40 is inserted through the shaft insertion holes 35 so as to be rotatable around the central axis C1 in the shaft insertion holes 35. The insertion shaft 40 is inserted through the insertion holes 32 so as to have a clearance in the insertion holes 32 and thus to be movable in the tilt direction C in the insertion holes 32.

The shaft insertion hole 35 restricts movement of the insertion shaft 40 in the axial direction X and the tilt direction C with respect to the column jacket 4. The insertion shaft 40 can move in the tilt direction C in conjunction with tilting of the column jacket 4. The insertion shaft 40 is positioned on the upper side Z1 with respect to the steering shaft 3. A left end portion of the insertion shaft 40 is positioned on the left side Y2 with respect to the left-side-Y2 side plate 30. A right end portion of the insertion shaft is positioned on the right side Y1 with respect to the right-side-Y1 side plate 30 of the upper bracket 6. At the left end portion of the insertion shaft 40, a head portion 40A is provided which has a larger diameter than the remaining part of the insertion shaft 40. A thread groove 40B is formed on an outer peripheral surface of the insertion shaft 40 at the right end portion thereof.

The operation member 41 is, for example, a lever that can be gripped. The operation member 41 includes a base end 41A that is a longitudinal end and a gripping portion 41B that is another longitudinal end. At the base end 41A, an insertion hole 41C is formed which penetrates the operation member 41 in the lateral direction Y. The insertion shaft 40 is inserted through the insertion hole 41C. The cam 42 integrally includes an annular plate portion 42A and a boss portion 42B. The plate portion 42A is located at the right side Y1 of the base end 41A of the operation member 41 so as to be adjacent to the base end 41A. The boss portion 42B extends from the plate portion 42A toward the left side Y2. A cam protrusion 42C is provided on a right side surface of the plate portion 42A.

The insertion shaft 40 is inserted through a space defined by an inner peripheral surface of the plate portion 42A and an inner peripheral surface of the boss portion 42B so as to be press-fitted in the space. Thus, the cam 42 can rotate integrally with the insertion shaft 40. The outer shape of the boss portion 42B is generally like, for example, a quadrangle as viewed in the lateral direction Y. The boss portion 42B is inserted through the insertion hole 41C in the operation member 41. This prevents the operation member 41 and the boss portion 42B from running idly. Consequently, the operation member 41 can rotate integrally with the cam 42 and the insertion shaft 40. As described above, the operation member 41 is attached to the left end portion of the insertion shaft 40 via the cam 42. A driver grips and operates the gripping portion 41B of the operation member 41, so that the insertion shaft 40 pivots along with the operation member 41 in accordance with an operation of the operation member 41.

Figure 4:
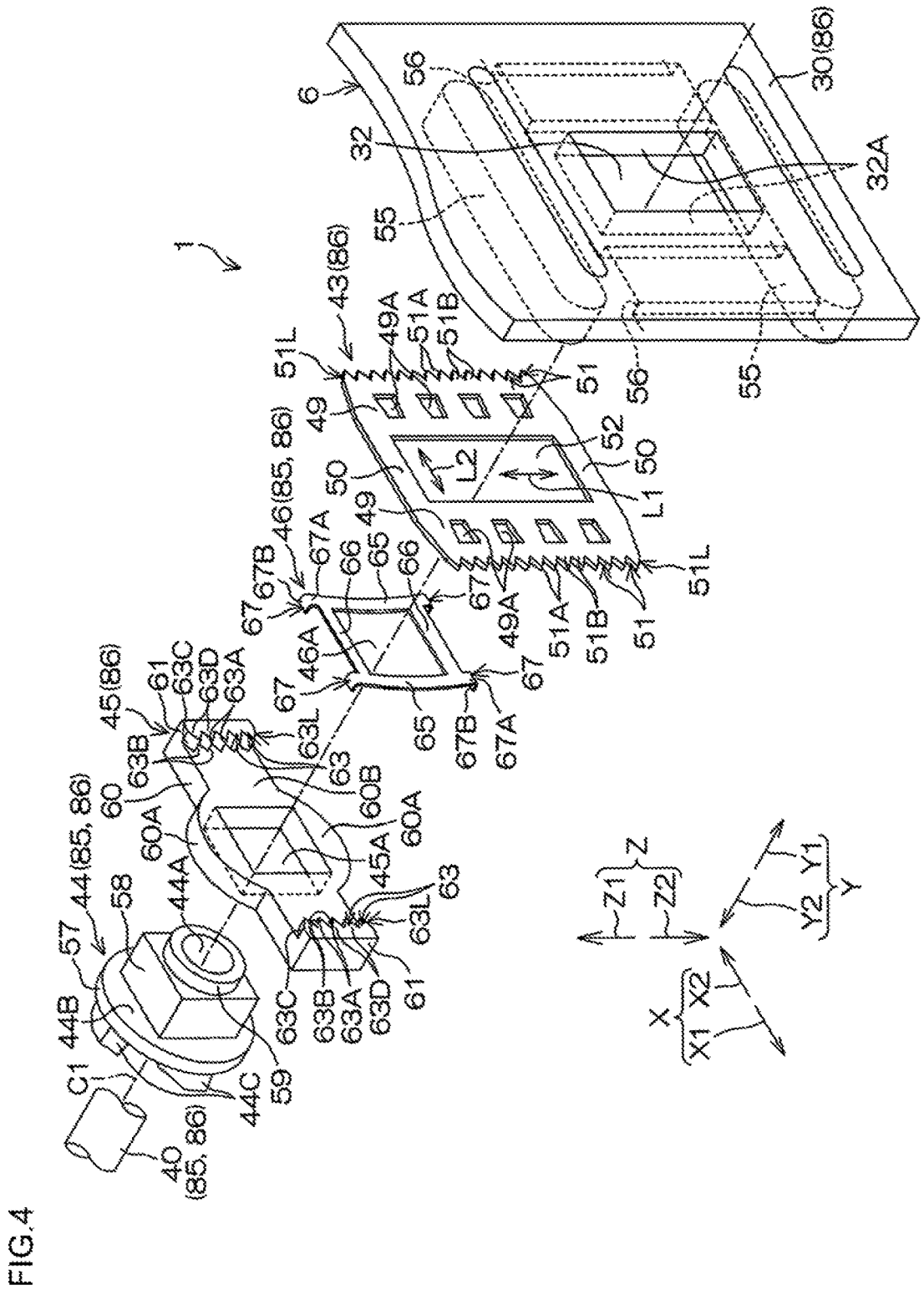
FIG. 4 is an exploded perspective view of members located near a left side plate of an upper bracket.

FIG. 4 is an exploded perspective view of members located around the left-side-Y2 side plate 30 of the upper bracket 6. As seen in FIG. 4, the first tooth member 43 is, for example, a metal plate that is elastically deformable in the lateral direction Y. An external contour of the first tooth member 43 is shaped generally like a quadrangle as viewed in the lateral direction Y.

The first tooth member 43 integrally includes a pair of support portions 49, a pair of coupling portions 50, and a pair of first tooth rows 51L. The support portions 49 are shaped like plates that are longitudinal in the up-down direction Z and that are thin in the lateral direction Y. The support portions 49 are disposed away from each other in the axial direction X. Each of the support portions 49 has a plurality of holes 49A serving as rigidity reducing portions that reduce the rigidity of the first tooth member. In each of the support portions 49, the holes 49A are aligned at regular intervals in the up-down direction Z. The holes 49A penetrate the support portion 49 in the lateral direction Y. The holes 49A in the rear-side-X1 support portion 49 are each shaped generally like a trapezoid with an upper base facing toward the front side X2, as viewed in the lateral direction Y. The holes 49A in the front-side-X2 support portion 49 are each shaped generally like a trapezoid with an upper base facing toward the rear side X1, as viewed in the lateral direction Y.

The coupling portions 50 are shaped like plates that are longitudinal in the axial direction X and that are thin in the lateral direction Y. The coupling portions 50 are disposed away from each other in the up-down direction Z. The coupling portions 50 couple the support portions 49 together. Specifically, the upper-side-Z1 coupling portion 50 is extended between upper ends of the support portions 49. The lower-side-Z2 coupling portion 50 is extended between lower ends of the support portions 49.

In the first tooth member 43, a linear slot 52 is formed which penetrates the first tooth member 43 in the lateral direction Y. The linear slot 52 extends in a first linear direction L1 that crosses the axial direction X and that is orthogonal to the lateral direction Y. In the first embodiment, the first linear direction L1 is a direction parallel to the up-down direction Z. The linear slot 52 is a space surrounded by the support portions 49 and the coupling portions 50. The insertion shaft 40 is inserted through the linear slot 52 (see FIG. 3).

Each of the first tooth rows 51L includes a plurality of first teeth 51 shaped generally like triangles and aligned in the first linear direction L1 (that is also the up-down direction Z). The front-side-X2 first tooth row 51L is provided at a front edge of the front-side-X2 support portion 49. The rear-side-X1 first tooth row 51L is provided at a rear edge of the rear-side-X1 support portion 49. The first teeth 51 of the front-side-X2 first tooth row 51L protrude from the front-side-X2 support portion 49 toward the front side X2. The first teeth 51 of the rear-side-X1 first tooth row 51L protrude from the rear-side-X1 support portion 49 toward the rear side X1.

The first teeth 51 of each of the first tooth rows 51L each have a tooth trace 51A extending in the lateral direction Y. Dedendum portions 51B of the first teeth 51 are supported by and integrated with the support portions 49. The first tooth member 43 is elastically deformable in the lateral direction Y as described above. However, in the first tooth member 43, at least the first tooth rows 51L may be elastically deformable in the lateral direction Y. The first tooth member 43 is located at the left side Y2 of the left-side-Y2 side plate 30 so as to be adjacent to the side plate 30 (see FIG. 3).

In connection with the first tooth member 43, a pair of first restriction portions 55 and a pair of recessed portions 56 are formed on the left-side-Y2 side plate 30 of the upper bracket 6. The first restriction portions 55 are formed by extruding the left-side-Y2 side plate 30. Each of the first restriction portions 55 is shaped generally like a rectangular parallelepiped that is longitudinal in a second linear direction L2 that crosses the first linear direction L1 and that is orthogonal to the lateral direction Y. The second linear direction L2 is orthogonal to the first linear direction L1 in the first embodiment. The first restriction portions 55 are integrated with the left-side-Y2 side plate 30. However, the first restriction portions 55 may be formed separately from and fixed to the left-side-Y2 side plate 30. The first restriction portions 55 are disposed away from each other in the up-down direction Z. Specifically, the respective first restriction portions 55 are disposed at an upper side and a lower side of the insertion hole 32 in the up-down direction Z.

As seen in FIG. 3, the first tooth member 43 is disposed between the first restriction portions 55 as viewed in the axial direction X. The upper-side-Z1 coupling portion 50 of the first tooth member 43 lies at the lower side Z2 of the upper-side-Z1 first restriction portion 55 so as to face the upper-side-Z1 first restriction portion 55. The lower-side-Z2 coupling portion 50 of the first tooth member 43 lies at the upper side Z1 of the lower-side-Z2 first restriction portion 55 so as to face the lower-side-Z2 first restriction portion 55. Accordingly, movement of the first tooth member 43 in the up-down direction Z with respect to the left-side-Y2 side plate 30 is restricted. The first tooth member 43 is supported by the left-side-Y2 side plate 30 via the first restriction portions 55 so as to be movable in the second linear direction L2 with respect to the left-side-Y2 side plate 30. The first restriction portions 55 extend in the second linear direction L2. This allows guiding movement of the first tooth member 43 in the second linear direction L2 with respect to the left-side-Y2 side plate 30.

The first restriction portions 55 restrict rotation of the first tooth member 43 around the insertion shaft 40. As seen in FIG. 4, the left-side-Y2 side plate 30 has peripheral portions 32A located at opposite sides of the insertion hole 32 in the axial direction X so as to define the insertion hole 32. Each of the recessed portions 56 is positioned outside the corresponding peripheral portion 32A in the axial direction X. The recessed portions 56 are formed by recessing the side plate 30 toward the right side Y1.

The clamping member 44 integrally includes an annular plate portion 57, a second restriction portion 58, and a tubular boss portion 59. The second restriction portion 58 is a block member, and the outer shape thereof is generally like a quadrangle as viewed from the right side Y1. The clamping member 44 includes a pressing surface 44B constituting a right side surface of the plate portion 57. The second restriction portion 58 extends from the pressing surface 44B toward the right side Y1. The boss portion 59 extends from a right side surface of the second restriction portion 58 toward the right side Y1. In the clamping member 44, a through-hole 44A is formed which penetrates the clamping member 44 in the lateral direction Y. An internal space in the boss portion 59 forms a part of the through-hole 44A.

As seen in FIG. 3, the clamping member 44 is located at the right side Y1 of the cam 42 so as to be adjacent to the cam 42. The insertion shaft 40 is inserted through the through-hole 44A so as to have a clearance in the through-hole 44A. Consequently, the clamping member 44 is supported by the insertion shaft 40 so as to be rotatable relative to the insertion shaft 40. On a left side surface of the plate portion 57 of the clamping member 44, a cam protrusion 44C is formed that can ride onto the cam protrusion 42C on the cam 42.

As seen in FIG. 4, the second tooth member 45 is, for example, a sintered compact formed of metal. The second tooth member 45 integrally includes a main body portion 60, a pair of protruding portions 61, and a pair of second tooth rows 63L. The main body portion 60 is shaped like a plate that is thin in the lateral direction Y. An external contour of the main body portion 60 is shaped generally like a rectangle that is longitudinal in the axial direction X as viewed in the lateral direction Y. Curved portions 60A are formed at respective opposite ends, in the up-down direction Z, of a substantially central portion of the main body portion 60 in the axial direction X. The upper-side-Z1 curved portion 60A is bulged toward the upper side Z1. The lower-side-Z2 curved portion 60A is bulged toward the lower side Z2. The contour of the curved portions 60A as viewed in the lateral direction Y has a curvature substantially equal to a circular-arc-shaped contour of the plate portion 57 of the clamping member 44 as viewed in the lateral direction Y.

Substantially at the center of the main body portion 60 in the up-down direction Z and in the axial direction X, a through-hole 45A is formed which penetrates the main body portion 60 in the lateral direction Y. The through-hole 45A is shaped generally like a quadrangle as viewed in the lateral direction Y. As seen in FIG. 3, the insertion shaft 40 and the second restriction portion 58 are inserted through the through-hole 45A. The main body portion 60 is located at the right side Y1 of the plate portion 57 of the clamping member 44 so as to be adjacent to the plate portion 57. The main body portion 60 lies at the left side Y2 of the first tooth member 43 so as to be opposed to the first tooth member 43.

As seen in FIG. 4, the protruding portions 61 are shaped generally like rectangles that are longitudinal in the up-down direction Z as viewed in the lateral direction Y. The protruding portions 61 protrude from respective opposite ends of the main body portion 60 in the axial direction X toward the right side Y1. Each of the second tooth rows 63L includes a plurality of second teeth 63 aligned along the first linear direction L1 (that is also the up-down direction Z). One second tooth row 63L is provided on each protruding portion 61 and thus the second tooth rows 63L are disposed away from each other in the axial direction X. The rear-side-X1 second tooth row 63L protrudes from a front surface of the rear-side-X1 protruding portion 61 toward the front side X2 such that tooth tips 63A of the second teeth 63 are directed toward the front side X2. The front-side-X2 second tooth row 63L protrudes from a rear surface of the front-side-X2 protruding portion 61 toward the rear side X1 such that direct the tooth tips 63A of the second teeth 63 are directed toward the rear side X1.

The tooth tip 63A of each of the second teeth 63 of each second tooth row 63L has a tooth trace 63B extending in the lateral direction Y. In each of the second tooth rows 63L, left ends 63C of the second teeth 63 corresponding to ends of the second teeth 63 near the main body portion 60 are fixed to a right side surface 60B of the main body portion 60. In each second tooth row 63L, dedendum portions 63D of the second teeth 63 are fixed to the protruding portion 61. As described above, each second tooth 63 is fixed at two positions thereof, that is, at the dedendum portion 63D and at the left end 63C, and thus has a high strength.

The elastic member 46 is, for example, a leaf spring formed by press-molding one metal plate. The elastic member 46 integrally includes a pair of deformation portions 65 and a pair of coupling portions 66. The deformation portions are disposed away from each other in the axial direction X. The coupling portions 66 are disposed away from each other in the up-down direction Z. The deformation portions 65 are thin in the lateral direction Y and are longitudinal in the up-down direction Z. A substantial center of each of the deformation portions 65 in the up-down direction Z is curved so as to bulge toward the left side Y2. The deformation portions 65 are elastically deformable in the lateral direction Y. On each of opposite ends of each deformation portion 65 in the up-down direction Z, a hook portion 67 is formed which is bent toward the left side Y2 like a crank.

Each of the hook portions 67 integrally includes a first portion 67A and a second portion 67B that is thin in the up-down direction Z. The first portion 67A is thin in the lateral direction Y and extends in the up-down direction Z. The second portion 67B is thin in the up-down direction Z and extends from a tip of the first portion 67A toward the left side Y2. The second portion 67B of each upper-side-Z1 hook portion 67 extends from an upper end of the first portion 67A. The second portion 67B of each lower-side-Z2 hook portion 67 extends from a lower end of the first portion 67A.

The coupling portions 66 of the elastic member 46 are thin in the lateral direction Y and are longitudinal in the axial direction X. The upper-side-Z1 coupling portion 66 is extended between upper ends of the deformation portions 65. The lower-side-Z2 coupling portion 67 is extended between lower ends of the deformation portions 65. A space 46A defined by the deformation portions 65 and the coupling portions 66 is shaped generally like a quadrangle that is substantially equal in shape to the through-hole 45A as viewed in the lateral direction Y.

As seen in FIG. 3, the elastic member 46 is located at the right side Y1 of the second tooth member 45 so as to be adjacent to the second tooth member 45. The elastic member 46 is located at the left side Y2 of the first tooth member 43 so as to be adjacent to the first tooth member 43. The insertion shaft 40 and the second restriction portion 58 are inserted through the space 46A. The second portions 67B of the upper-side-Z1 hook portions 67 of the elastic member 46 lie at the upper side Z1 of the main body portion 60 of the second tooth member 45 so as to engage with the main body portion 60. The second portions 67B of the lower-side-Z2 hook portions 67 of the elastic member 46 lie at the lower side Z2 of the main body portion 60 of the second tooth member 45 so as to engage with the main body portion 60. Consequently, the elastic member 46 is integrated with the second tooth member 45.

Figure 5:
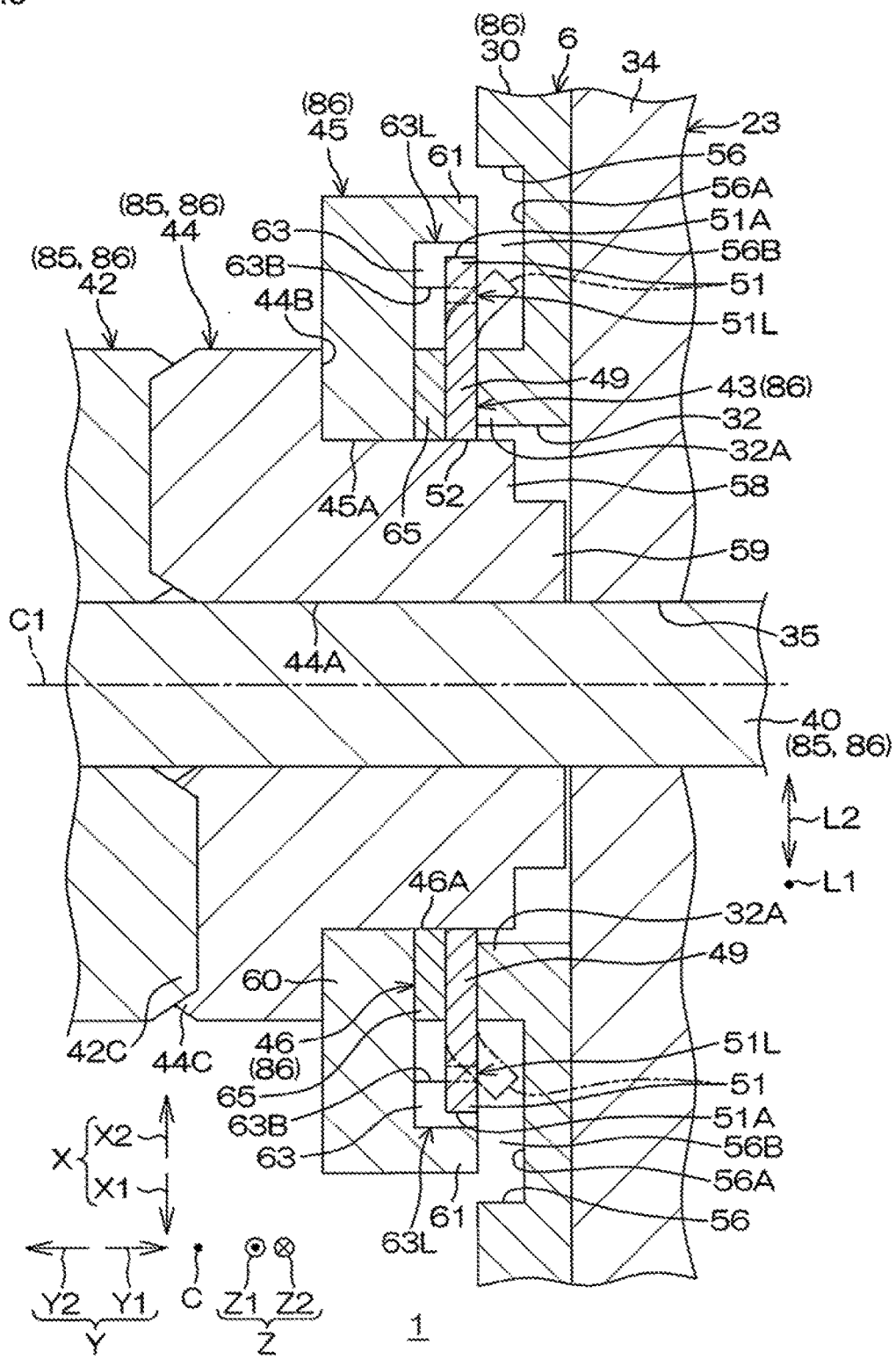
FIG. 5 is a sectional view taken along the line V-V in FIG. 3.

FIG. 5 is a sectional view taken along the line V-V in FIG. 3. As seen in FIG. 5, the second restriction portion 58 of the clamping member 44 is inserted through the through-hole 45A in the second tooth member 45, the space 46A in the elastic member 46, and the linear slot 52 in the first tooth member 43 in this order from the left side Y2. As described above, the insertion shaft 40 is inserted through the through-hole 44A in the clamping member 44. Consequently, the second tooth member 45 and the elastic member 46 are supported by the insertion shaft 40 via the clamping member 44. As described above, the through-hole 45A, the space 46A, and the second restriction portion 58 are each shaped generally like a quadrangle as viewed in the lateral direction Y. Thus, the second tooth member 45 and the elastic member 46 are prevented from running idly with respect to the second restriction portion 58. The second restriction portion 58 is coupled to the second tooth member 45.

A clearance between the second restriction portion 58 and each of the opposite ends of the linear slot 52 in the axial direction X is slight and only enough to allow the second restriction portion 58 to move in the up-down direction Z along and relative to the linear slot 52. Thus, the second restriction portion 58 is movable in the first linear direction L1 with respect to the linear slot 52 and is immovable in the second linear direction L2 with respect to the linear slot 52. This restricts movement of the second tooth member 45 in the second linear direction L2 with respect to the first tooth member 43.

Idle running of the clamping member 44 with respect to the first tooth member 43 is prevented by contact between opposite end surfaces of the second restriction portion 58 in the axial direction X and opposite edges of the linear slot 52 in the axial direction X. As described above, rotation of the first tooth member 43 around the insertion shaft 40 is restricted by the first restriction portions 55. This restricts rotation, around the insertion shaft 40, of the clamping member 44, the second tooth member 45, and the elastic member 46. Idle running of the clamping member 44 with respect to the first tooth member 43 is prevented. Idle running of the second tooth member 45 with respect to the second restriction portion 58 of the clamping member 44 is prevented.

A right end of the second restriction portion 58 of the clamping member 44 and the whole boss portion 59 are inserted through the insertion hole 32 so as to have a clearance in the insertion hole 32. A bottom surface 56A of each recessed portion 56 lies at the right side Y1 of the corresponding first tooth row 51L so as to face the first tooth row 51L. The peripheral portions 32A of the insertion hole 32 sandwich the support portions 49 of the first tooth member 43, the deformation portions 65 of the elastic member 46, and the main body portion 60 of the second tooth member 45 between the peripheral portions 32A and the pressing surface 44B of the clamping member 44, and is located on the right side of the right side of the clamping member 44. The peripheral portions 32A lie at the right side Y1 of the pressing surface 44B of the clamping member 44 so as to face the pressing surface 44B. The deformation portions 65 of the elastic member 46 are compressed in the lateral direction Y between the main body portion 60 of the second tooth member 45 and the support portions 49 of the first tooth member 43.

As seen in FIG. 3, the cam 42 rotates in accordance with an operation of the operation member 41 to allow the cam protrusion 42C rides onto the cam protrusion 44C. Consequently, the clamping member 44 moves in the lateral direction Y along the central axis C1. The second tooth member 45 is located at the right side Y1 of the plate portion 57 of the clamping member 44 so as to be adjacent to the plate portion 57. Thus, the second tooth member 45 moves toward the right side Y1 in conjunction with movement of the clamping member 44 toward the right side Y1.

The steering system 1 includes a first tooth member 71, a second tooth member 72, an elastic member 73, a nut 74, a needle roller bearing 75, and a thrust washer 76. The first tooth member 71 is disposed near the right-side-Y1 side plate 30. The first tooth member 71, the second tooth member 72, and the elastic member 73 on the right side Y1 are obtained by inverting the first tooth member 43, the second tooth member 45, and the elastic member 46 on the left side Y2, respectively, with respect to the reference plane 3D. The right-side-Y1 side plate 30 is provided with a pair of first restriction portions 77 and a pair of recessed portions 78. The first restriction portions 77 and the recessed portions 78 are obtained by inverting the first restriction portions 55 and the recessed portions 56 formed on the left-side-Y2 side plate 30 with respect to the reference plane 3D.

The components of the first tooth member 71, the second tooth member 72, the elastic member 73, the first restriction portions 77, and the recessed portions 78 are denoted by the same reference numerals as those of the corresponding components of the first tooth member 43, the second tooth member 45, the elastic member 46, the first restriction portions 55, and the recessed portions 56. Description of these components is omitted. FIG. 3 depicts only one of the recessed portions 56 and only one of the recessed portions 78.

The right-side-Y1 clamping member 79 is approximately equal in shape to the left-side-Y2 clamping member 44 with only the lateral orientation thereof inverted. The components of the clamping member 44 are denoted by the same reference numerals as those of the clamping member 44, and description thereof will not be omitted below. However, unlike the clamping member 44, the right-side-Y1 clamping member 79 is not provided with the cam protrusion 44C. The nut 74 is attached to the thread groove 40B in the insertion shaft 40. The following are interposed between the nut 74 and the right-side-Y1 clamped portions 34: the right-side-Y1 side plate 30, the first tooth member 71, the second tooth member 72, the elastic member 73, the clamping member 79, the annular needle roller bearing 75, and the thrust washer 76. Between the clamping member 79 and the nut 74, the needle roller bearing 75 and the thrust washer 76 are disposed in this order from the left side Y2. The insertion shaft 40 is inserted through each of the linear slot 52 in the first tooth member 71, the through-hole 45A in the second tooth member 72, the space 46A in the elastic member 73, the through-hole 44A in the clamping member 79, the needle roller bearing 75, and the thrust washer 76.

As seen in FIG. 3, a left-side-Y2 tilt lock mechanism 86 includes the left-side-Y2 side plate 30, the insertion shaft 40, the cam 42, the first tooth member 43, the clamping member 44, the second tooth member 45, and the elastic member 46. The tilt lock mechanism 86 is a mechanism configured to firmly lock the column jacket 4 in position in the tilt direction C and to release the lock of the column jacket 4 in position.

Like the tilt lock mechanism 86, a right-side-Y1 tilt lock mechanism 87 includes the right-side-Y1 side plate 30, the insertion shaft 40, the first tooth member 71, the clamping member 79, the second tooth member 72, and the elastic member 73. The steering system 1 includes a tubular lock member 80, a transmission member 81, and a plate-like lock plate 82 extending in the axial direction X. The lock member 80, the transmission member 81, and the lock plate 82 are disposed between the clamped portions 34 as viewed in the axial direction X. The lock member 80 is rotatably supported by the insertion shaft 40. The lock plate 82 is fixed to the upper jacket 22. The transmission member 81 includes a cam used to transmit rotation of the insertion shaft 40 the lock member 80 and a spring used to bias the lock member 80 toward the lock plate 82.

A tooth portion 80A provided on the lock member 80 meshes with a tooth portion 82A provided on the lock plate 82 to firmly lock the steering member 11 (see FIG. 1) in position in the axial direction X (a form in a locked state described below). Meshing between the tooth portion 80A and the tooth portion 82A is released to release the lock of the steering member 11 in position in the axial direction X (a form during a released state described below). As described above, the lock member 80, the transmission member 81, and the lock plate 82 are included in a telescopic lock mechanism 83.

Now, operations of the steering system 1 will be described. The characteristic tilt lock mechanism 86 will be described below, and description of the telescopic lock mechanism 83 will be omitted. After performing tilt adjustment or telescopic adjustment, the driver rotates the operation member 41. The clamping member 44 moves toward the right side Y1 along the central axis C1 of the insertion shaft 40 while compressing the deformation portions 65 of the elastic member 46 via the main body portion 60 of the second tooth member 45. As depicted in FIG. 5, the clamping member 44 presses the peripheral portions 32A of the insertion hole 32 in the left-side-Y2 side plate 30. This reduces the distance between the clamping member 44 and the clamping member 79 in the lateral direction Y. Between the clamping member 44 and the clamping member 79, the side plates 30 are clamped from the opposite sides in the lateral direction Y. Each of the side plates 30 and the corresponding clamped portion 34 are frictionally held together. The lower jacket 23 and the upper jacket 22 are frictionally held together. This precludes pivoting and extension and contraction of the column jacket 4 and makes the steering member 11 (see FIG. 1) immovable in the tilt direction C and the axial direction X.

A state of the steering system 1 where the position of the steering member 11 is fixed in the tilt direction C and the axial direction X is referred to as a "locked state". During normal driving, the steering system 1 is in the locked state. In the steering system 1 in the locked state, when the operation member 41 is rotated in a direction opposite to the direction described above, the clamping member 44 is biased by the elastic member 46 via the second tooth member 45 to move toward the left side Y2. This increases the distance between the clamping member 44 and the clamping member 79. Clamping of the side plates 30 between the clamping member 44 and the clamping member 79 is released. The frictional holding of each side plates 30 and the corresponding clamped portion 34 is released. The frictional holding of the lower jacket 23 and the upper jacket 22 is released. The steering member 11 (see FIG. 1) is made movable in the tilt direction C and in the axial direction X.

A state of the steering system 1 where the fixation of the position of the steering member 11 in the tilt direction C and the axial direction X is released is referred to as a "released state". A clamping mechanism 85 includes the insertion shaft 40, the operation member 41, the cam 42, the clamping member 44, the elastic member 46, the elastic member 73, the nut 74, the needle roller bearing 75, the thrust washer 76, and the clamping member 79. The clamping mechanism 85 clamps the side plates 30 and the clamped portions 34 to lock the steering member 11 in position after the tilt adjustment or the telescopic adjustment is completed. The clamping mechanism 85 is configured to release the clamping to enable tilt adjustment and telescopic adjustment of the steering member 11 (see FIG. 1).

In the locked state, the first teeth 51 of the first tooth rows 51L and the second teeth 63 of the second tooth rows 63L overlap (phase shift) or do not overlap (phase matching) depending on a tilt adjustment position. Now, an operation for meshing between the first tooth member 43 and the second tooth member 45 will be described.

An operation for meshing between the first tooth member 71 and the second tooth member 72, disposed around the right-side-Y1 side plate 30 is the same as the operation for meshing between the first tooth member 43 and the second tooth member 45, disposed around the left-side-Y2 side plate 30. Therefore, a configuration of the left-side-Y2 side plate 30 will be described below in detail, and description of a configuration of the right-side-Y1 side plate 30 will be omitted. This also applies to operations of the first tooth member 43 and the second tooth member 45 during tilt adjustment described below.

Figure 6:
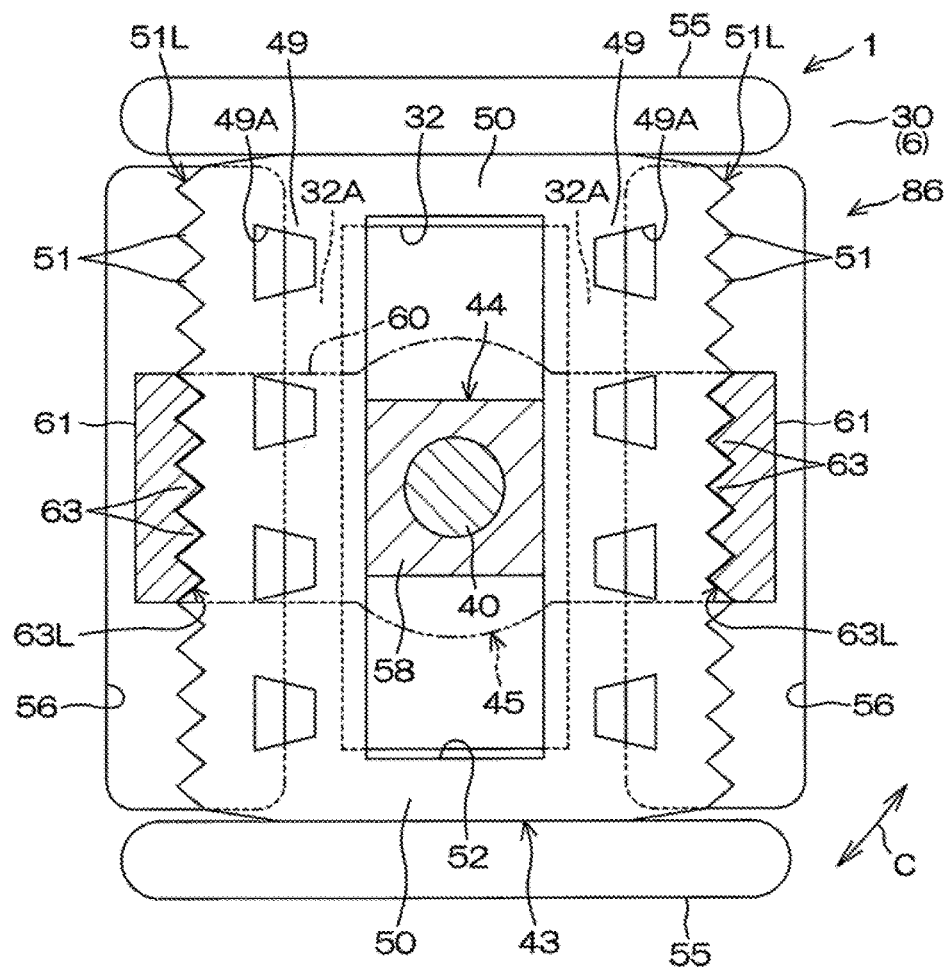
FIG. 6 is a sectional view taken along the line VI-VI in FIG. 3.

FIG. 6 is a sectional view taken along the line VI-VI in FIG. 3. The main body portion 60 of the second tooth member 45 originally does not appear in the sectional view taken along the line VI-VI, but is depicted in FIG. 6 by long dashed double-short dashed lines for convenience of description. As depicted in FIG. 6, when the second tooth member 45 moves toward the right side Y1 in accordance with an operation of the operation member 41 (see FIG. 3), if the first teeth 51 of first tooth rows 51L and the second teeth 63 of the second tooth rows 63L are in a positional relation in which the first teeth 51 and the second teeth 63 do not overlap as viewed from the left side Y2, the positional relation changes when the operation of the operation member 41 is completed. That is, the first teeth 51 and the second teeth 63 are alternately aligned in the first linear direction L1 and the pressing surface 44B of the clamping member 44 presses the peripheral portions 32A of the insertion hole 32 in the left-side-Y2 side plate 30. Therefore, the locked state can be reached without obstruction by the first teeth 51 of the first tooth rows 51L and the second teeth 63 of the second tooth rows 63L. At this time, the first teeth 51 are meshed with the second teeth 63 in a direction (corresponding to the lateral direction Y) in which the tooth traces of the first and second teeth 51, 63 extend (see FIG. 5).

Figure 7:
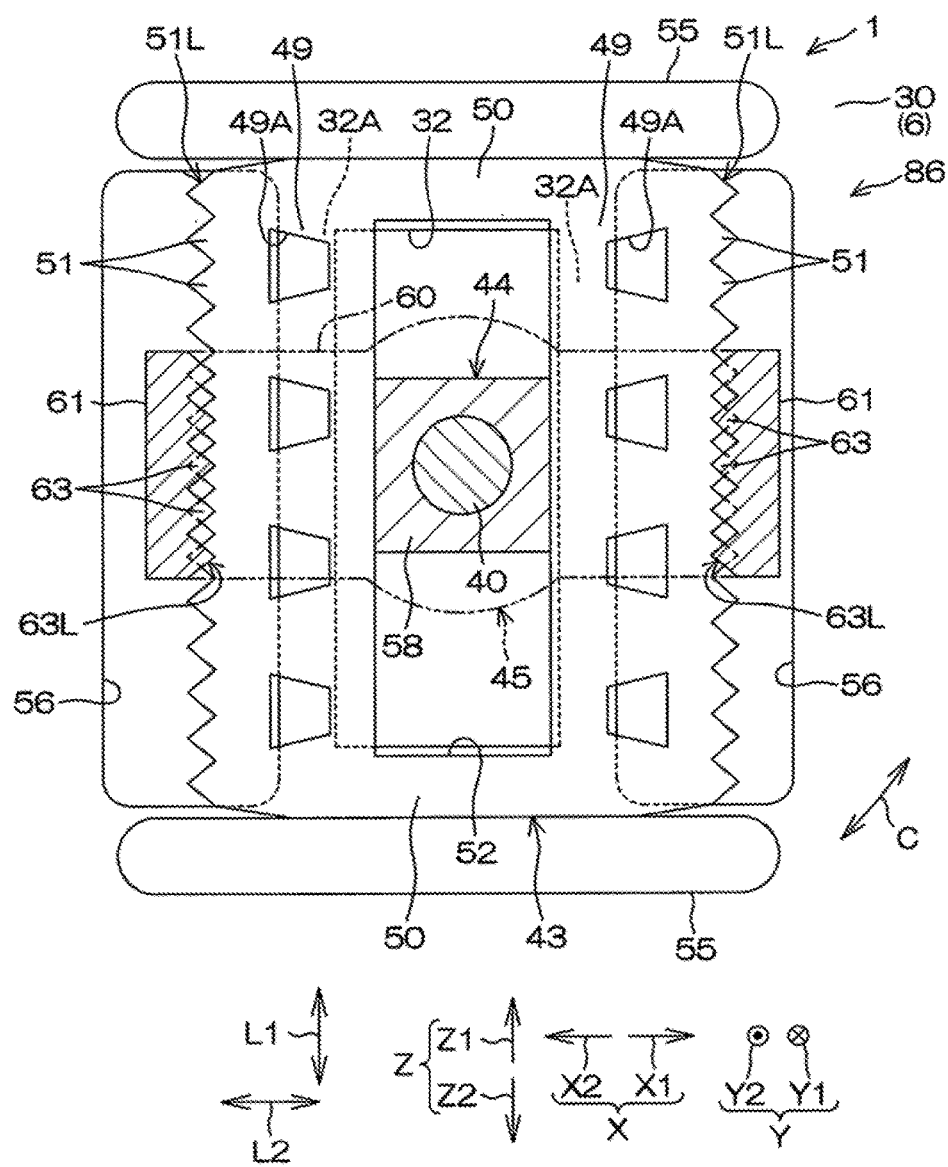
FIG. 7 is a diagram illustrating that, in FIG. 6, a second tooth row has ridden onto a first tooth row.

FIG. 7 is a diagram illustrating that, in FIG. 6, the second tooth rows 63L have ridden onto the respective first tooth rows 51L. As depicted in FIG. 7, when the second tooth member 45 moves toward the right side Y1, if the first teeth 51 of the first tooth rows 51L and the second teeth 63 of the second tooth rows 63L are in a positional relation in which the first teeth 51 and the second teeth 63 overlap as viewed from the left side Y2, the second tooth rows 63L ride onto the first tooth rows 51L before the pressing surface 44B (see FIG. 5) of the clamping member 44 presses the peripheral portions 32A of the insertion hole 32 in the left-side-Y2 side plate 30. A state where the second tooth rows 63L ride onto and fail to mesh with the first tooth rows 51L is referred to as a tooth-on-tooth state.

As seen in FIG. 5, the recessed portions 56 are formed in the left-side-Y2 side plate 30 at the positions thereof where the recessed portions 56 face the respective first tooth rows 51L of the first tooth member 43 as described above. Thus, a space 56B is present at the right side Y1 of each first tooth row 51L. Therefore, in the tooth-on-tooth state, the first teeth 51 in a part of each first tooth row 51L that has ridden onto the corresponding second tooth row 63L are deflected and housed in the corresponding space 56B, as depicted by long dashed double-short dashed lines in FIG. 5. The holes 49A serving as rigidity reducing portions are formed in the first tooth member 43. Thus, the first tooth rows 51L can be easily deflected.

As described above, even in the tooth-on-tooth state, the first teeth 51 is deflected toward the right side Y1 to allow the first tooth rows 51L and the second tooth rows 63L to come into pressure contact with each other. The pressing surface 44B of the clamping member 44 transmits a force to the left-side-Y2 side plate 30 via the main body portion 60 of the second tooth member 45, the deformation portions 65 of the elastic member 46 and the support portions 49 of the first tooth member 43, so that the left-side-Y2 side plate 30 is pressed. Therefore, the operation member 41 (see FIG. 3) does not become non-rotatable during operation, so that the steering system 1 can reach the locked state.

Figure 8:
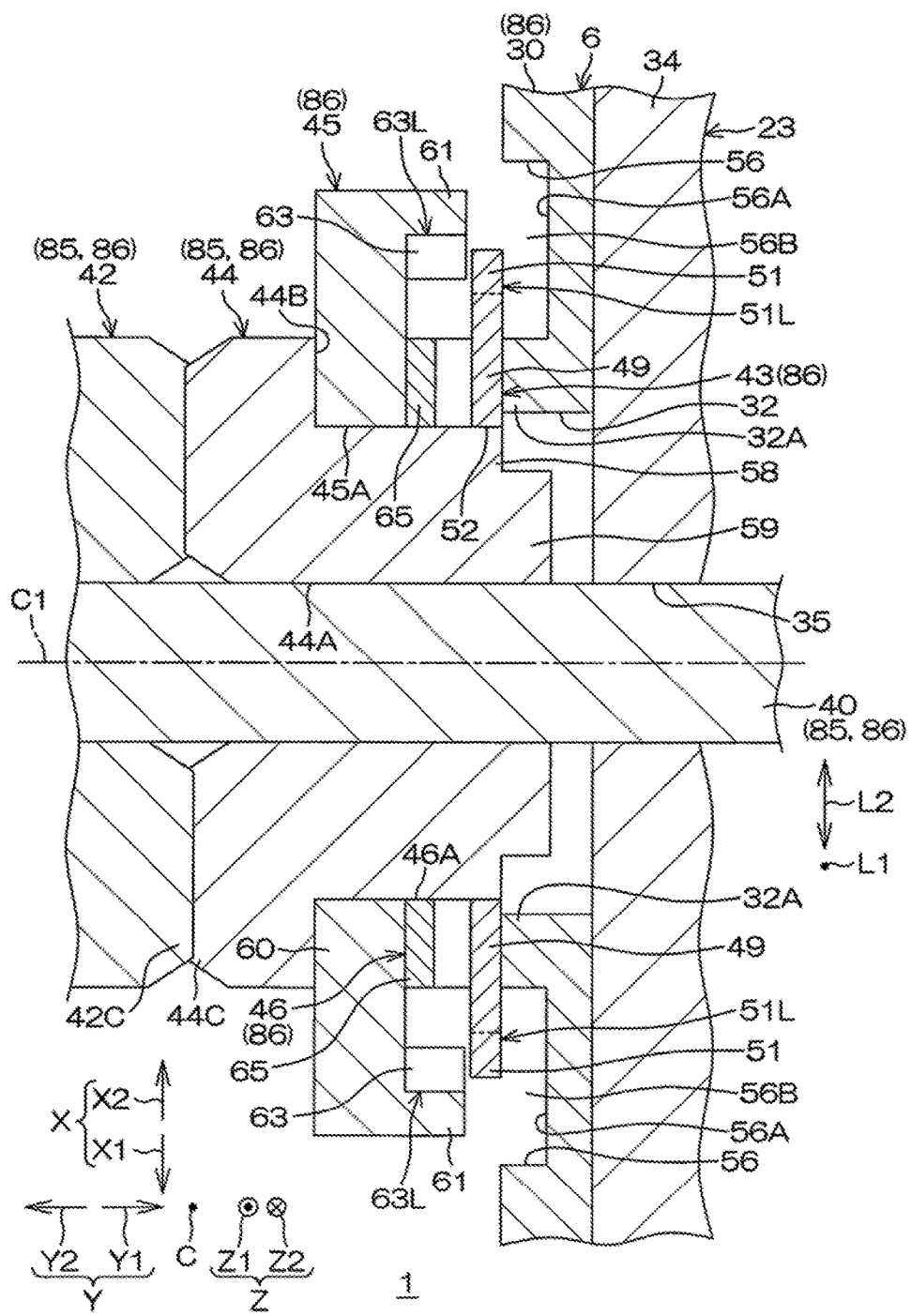
FIG. 8 is a diagram illustrating that, in FIG. 5, a released state.

As described above, the steering system 1 can be brought into the locked state regardless of the positional relation between first tooth rows 51L and the second tooth rows 63L. That is, what is called stepless lock can be achieved in which the steering system 1 can be brought into the locked state regardless of whichever tilt adjustment position is set. FIG. 8 is a diagram illustrating the released state in FIG. 5.

As described above, when the locked state changes to the released state, the clamping member 44 and the second tooth member 45 move toward the left side Y2 due to the biasing force of the deformation portions 65 of the elastic member 46. Thus, the second tooth rows 63L of the second tooth member 45 are separated from the respective first tooth rows 51L of the first tooth member 43 toward the left side Y2, as depicted in FIG. 8. If, in the locked state, the first teeth 51 are deflected due to the tooth-on-tooth state, the first teeth 51 return to an elastically undeformed state as a result of a change from the locked state to the released state.

In the released state, the second restriction portion 58 of the clamping member 44 remains extending through the through-hole 45A in the second tooth member 45, the space 46A in the elastic member 46, and the linear slot 52 in the first tooth member 43. In the released state, the second restriction portion 58 of the clamping member 44 is placed outside the insertion hole 32, and only the boss portion 59 of the clamping member 44 remains extending through the insertion hole 32. However, the right end of the second restriction portion 58 may also remain extending through the insertion hole 32.

Figure 9:
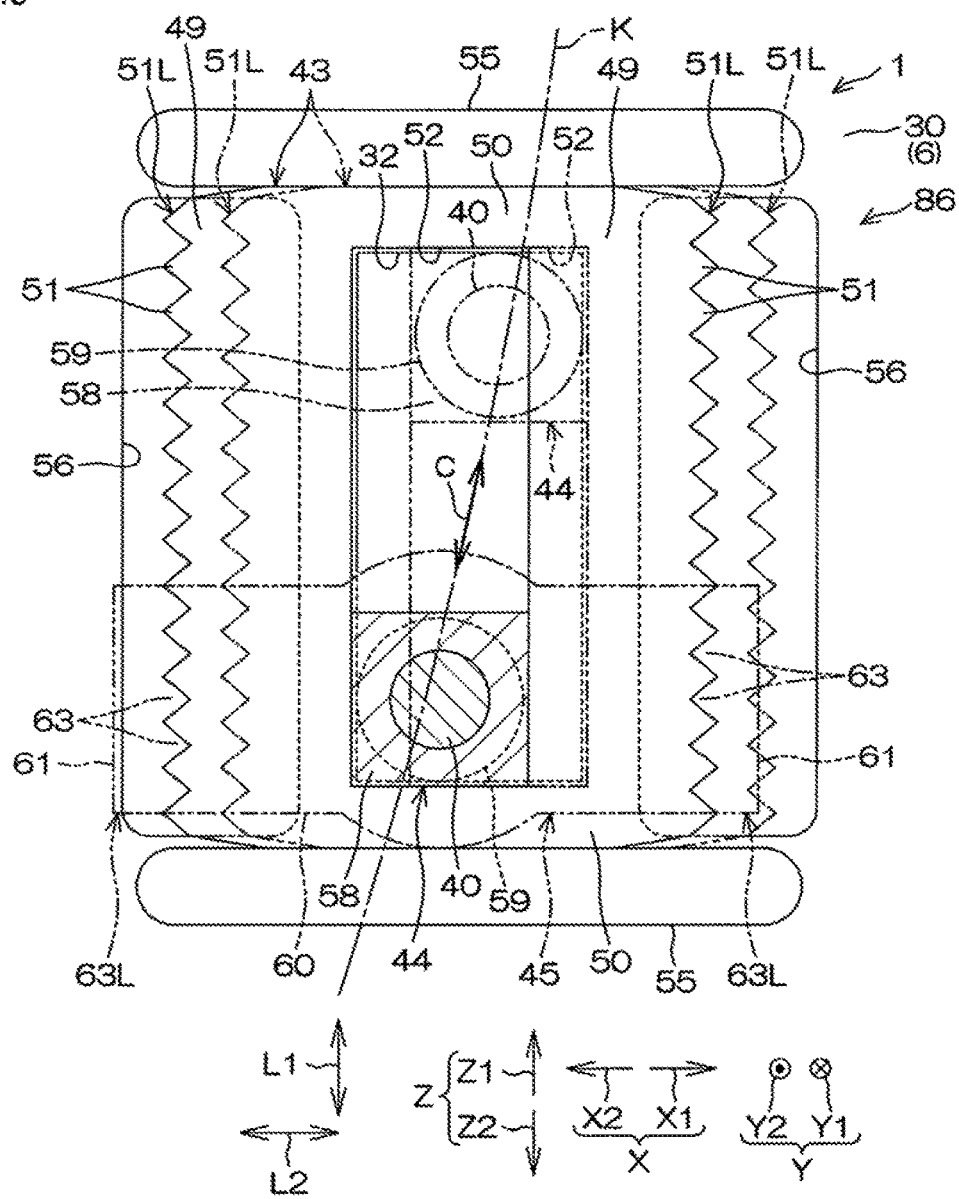
FIG. 9 is a schematic diagram illustrating operations of relevant members during tilt adjustment.

Now, operations of the first tooth member 43 and the second tooth member 45 during tilt adjustment will be described. As seen in FIG. 9 that is a schematic diagram illustrating operations of the relevant members during tilt adjustment, when tilt adjustment is performed in the released state, the insertion shaft 40 moves in the tilt direction C, in the insertion holes 32 in the upper bracket 6. In FIG. 9, illustration of the holes 49A in the first tooth member 43 is omitted, and the second tooth member 45 is depicted by long dashed double-short dashed lines, for convenience of description. FIG. 9 depicts, by continuous lines, the insertion shaft 40 and the clamping member 44 in a state where the insertion shaft 40 has been moved to the lowest position in the tilt direction C as a result of tilt adjustment. FIG. 9 depicts, by long dashed double-short dashed lines, the insertion shaft 40 and the clamping member 44 in a state where the insertion shaft 40 has been moved to the highest position in the tilt direction C as a result of tilt adjustment.

In the insertion holes 32 in the right and left side plates 30 of the upper bracket 6, the insertion shaft 40 can move in the tilt direction C along with the second restriction portion 58 or the boss portion 59 of each of the clamping member 44 and the clamping member 79. However, in the shaft insertion holes 35 in the lower jacket 23 of the column jacket 4, the insertion shaft 40 can rotate around the central axis C1 but cannot move in other directions. Thus, when the column jacket 4 is tilted for tilt adjustment, the insertion shaft 40 pivots in the tilt direction C along with the column jacket 4. Consequently, the upper bracket 6 supports the column jacket 4 via the insertion shaft 40 so as to enable the column jacket 4 to pivot.

Figure 10:
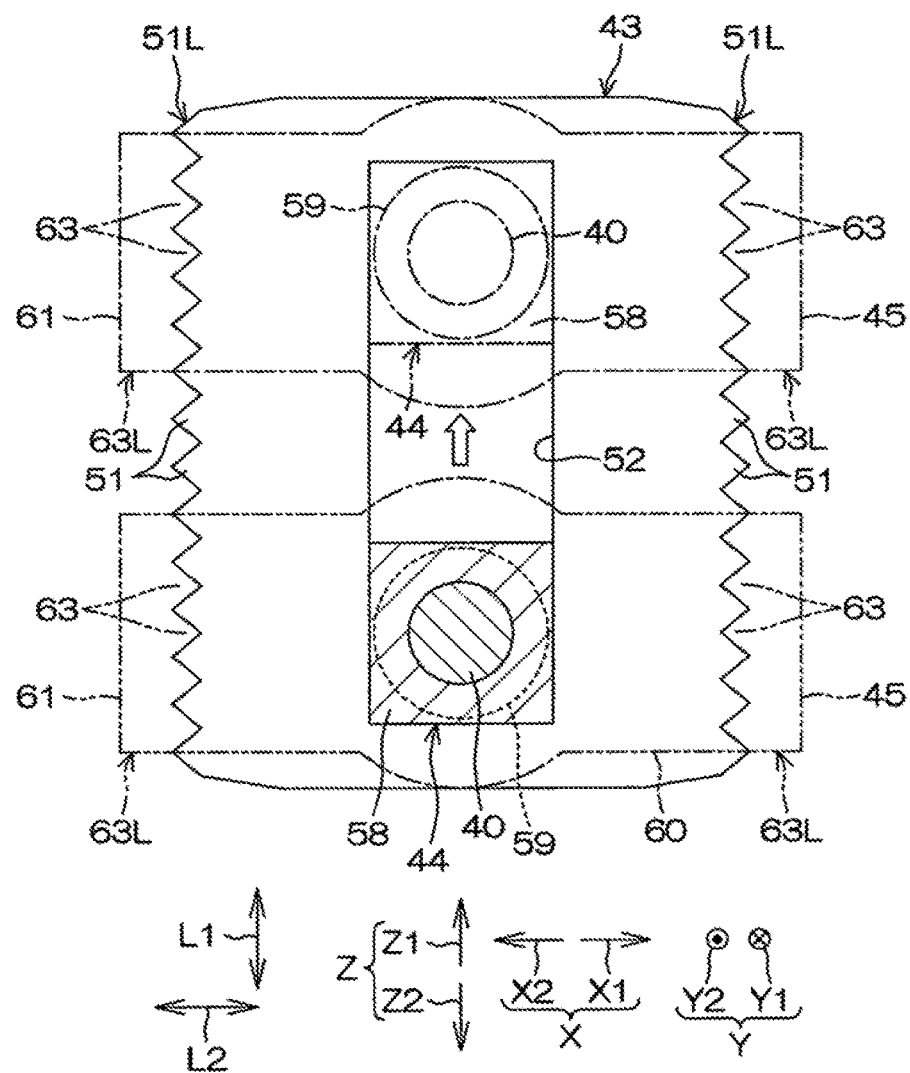
FIG. 10 is a schematic diagram illustrating movement of a second restriction portion to a first tooth member.

When the driver moves the steering member 11 (see FIG. 1) in the tilt direction C for tilt adjustment, the column jacket 4 as a whole is tilted relative to the upper bracket 6. Tilt adjustment of the steering member 11 is performed to the extent that the second restriction portion 58 and the boss portion 59 of the clamping member 44 can move in the insertion hole 32. The first tooth member 43, supported by the left-side-Y2 side plate 30 of the upper bracket 6, can move in the second linear direction L2. However, the first restriction portions 55 restrict movement of the first tooth member 43 in the first linear direction L1 with respect to the left-side-Y2 side plate 30. FIG. 10 is a schematic diagram illustrating movement of the second restriction portion 58 with respect to the first tooth member 43. As depicted in FIG. 10, the second restriction portion 58 coupled to the second tooth member 45 is inserted through the linear slot 52 in the first tooth member 43. In this state, the second restriction portion 58 is movable in the first linear direction L1 but is immovable in the second linear direction L2. Consequently, the second tooth member is movable in the first linear direction L1 relative to the first tooth member 43 and also movable in the second linear direction L2 integrally with the first tooth member 43. FIG. 10 depicts, by long dashed double-short dashed lines, the second tooth member 45 in a state where the insertion shaft 40 has been moved to the lowest position in the tilt direction C as a result of tilt adjustment. FIG. 10 depicts, by long dashed short dashed lines, the insertion shaft 40, the clamping member 44, and the second tooth member 45 in a state where the insertion shaft 40 has been moved to the highest position in the tilt direction C as a result of tilt adjustment.

As seen in FIG. 9, the insertion shaft 40 pivots in the tilt direction C along with the column jacket 4 for tilt adjustment of the steering member 11 (see FIG. 1). The second tooth member 45 pivots by moving linearly in the first linear direction L1 with respect to the first tooth member 43 while moving linearly in the second linear direction L2 with respect to the upper bracket 6 along with the first tooth member 43. In other words, the pivoting of the second tooth member 45 can be decomposed into the linear movement in the first linear direction L1 and the linear movement in the second linear direction L2. This eliminates the need to align, in the tilt direction C along the circular-arc-shaped trajectory K, the second teeth 63 in the second tooth rows 63L of the second tooth member and the first teeth 51 in the first tooth rows 51L of the first tooth member 43 that mesh with the second tooth row 63L. Thus, the first teeth 51 and the second teeth 63 can be aligned in the first linear direction L1. In this case, the shapes and arrangements of the first tooth rows 51L and the second tooth rows 63L are not affected by the trajectory K. Accordingly, the shapes and arrangements of the first tooth rows 51L and the second tooth rows 63L need not be changed even when the curvature of the trajectory K varies according to the type of the vehicle in which the steering system 1 is mounted. Thus, the common first tooth member 43 and the common second tooth member 45 can be applied even to a plurality of vehicle types with different curvatures of the trajectory K.

Specifically, even when a distance D (see FIG. 1) between the central shaft 5C and the insertion shaft 40 varies according to the vehicle type, variation occurs only in the moving distances (sliding distances) of the first tooth member 43 and the second tooth member 45 in the second linear direction L2 and the moving distance of the second tooth member 45 in the first linear direction L1 with respect to the first tooth member 43. The directions in which the first teeth 51 and the second teeth 63 are aligned need not be changed. Thus, the common first tooth member 43 and the common second tooth member 45 can be used for various applications. This enables a reduction in parts costs.

In a configuration in which the first teeth 51 and the second teeth 63 are aligned along the tilt direction C (for example, a configuration in a comparative example described below) unlike in the first embodiment, the first teeth 51 and the second teeth 63 need to be designed so as to extend radially from the central shaft 5C. Thus, even with a 1-mm change in the distance D (see FIG. 1) between the central shaft 5C and the insertion shaft 40, tooth pitches need to be varied for the front-side-X2 first tooth row 51L and second tooth row 63L and for the rear-side-X1 first tooth row 51L and second tooth row 63L. On the other hand, in a configuration in which the first teeth 51 and the second teeth 63 are aligned along the first linear direction L1 as in the first embodiment, the tooth pitches for the first tooth rows 51L and the second tooth rows 63L need not be varied according to the position in the axial direction X.

During tilt adjustment, the elastic member 46 supported by the insertion shaft 40 via the second restriction portion 58 performs the same operation as that of the second tooth member 45. This prevents the second tooth member 45 and the elastic member 46 from moving in the first linear direction L1 or the second linear direction L2 relative to each other as a result of the tilt adjustment. A steering system in a comparative example is assumed in which the first tooth member 43 is fixed to the left-side-Y2 side plate 30 and a tilt groove extending in the tilt direction C is formed in the left-side-Y2 side plate 30. In the comparative example, movement of the second tooth member 45 during the tilt adjustment is guided through the tilt groove. In the comparative example, movement of the second tooth member 45 during tilt adjustment is guided by the tilt groove. In the steering system in the comparative example, a dimensional variation involved in the meshing between each first tooth row 51L and the corresponding second tooth row 63L is the sum of variations in the dimensions of the first tooth member 43, the second tooth member 45, and the clamping member 44, and a dimensional variation in the tilt groove in the left-side-Y2 side plate 30, in other words, the sum of the variations in the dimensions of the four components.

In the steering system 1 in the first embodiment, movement of the second tooth member 45 during the tilt adjustment is directly guided through the linear slot 52 in the first tooth member 43. Thus, unlike in the comparative example, the dimensional variation involved in the meshing between each first tooth row 51L and the corresponding second tooth row 63L does not includes a variation in the dimensions of the left-side-Y2 side plate 30. That is, the dimensional variation involved in the meshing between each first tooth row 51L and the corresponding second tooth row 63L is the sum of the variations in the dimensions of the first tooth member 43, the second tooth member 45, and the clamping member 44, that is, the sum of the variations in the dimensions of the three components.

Therefore, compared to the steering system in the comparative example, the steering system 1 in the first embodiment can increase accuracy in the axial direction X involved in the meshing between each first tooth row 51L and the corresponding second tooth row 63L. This allows suppression of a situation where the above-described variation causes each first tooth row 51L and the corresponding second tooth row 63L to be shifted from each other in the axial direction X to in turn cause the first tooth row 51L and the second tooth row 63L to ride onto each other or to reduce the amount by which the first tooth row 51L and the second tooth row 63L mesh with each other. As a result, a force that holds the steering member 11 in position in the tilt direction C, that is, a tilt holding force, can be increased.

The right-side-Y1 tilt lock mechanism 87 produces effects similar to the above-described effects of the left-side-Y2 tilt lock mechanism 86. Now, a secondary collision is assumed to occur which follows a vehicle collision and in which the driver collides against the steering member 11. When the secondary collision occurs with each second tooth row 63L having ridden onto the corresponding first tooth row 51L (see long dashed double-short dashed lines in FIG. 5), the second tooth member 45 moves in the up-down direction Z with respect to the first tooth member 43 to resolve the riding of the second tooth row 63L onto the first tooth row 51L. Consequently, the first tooth row 51L returns to an elastically undeformed state and meshes with the second tooth row 63L.

At the time of the secondary collision, the column jacket 4 holding the steering shaft 3 acts to move in the tilt direction C along with the second tooth member 45. On the other hand, the first tooth member 43 supported by the upper bracket 6 fixed to the vehicle body 2 does not move in the up-down direction Z. Thus, with the first tooth row 51L and the corresponding second tooth row 63L meshed with each other, the position of the steering member 11 in the up-down direction Z is maintained.

Figure 11:
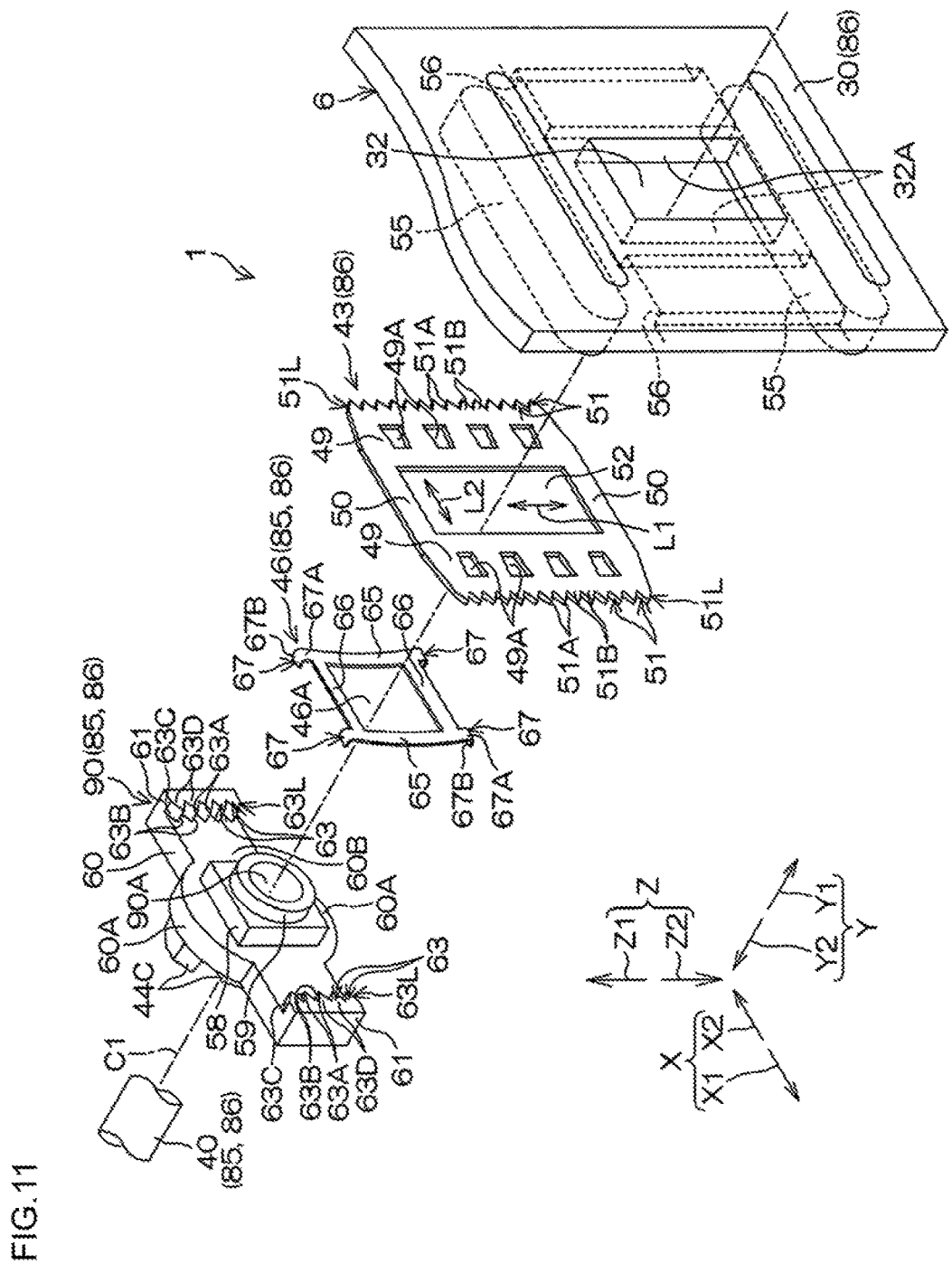
FIG. 11 is a diagram in which a variation of the first embodiment is applied in FIG. 4.

Now, a variation of the first embodiment will be described. FIG. 11 is a diagram illustrating that the variation of the first embodiment is applied in FIG. 4. Members in FIG. 11 that are the same as those described above are denoted by the same reference numerals, and will description thereof will be omitted. As is apparent from a comparison between FIG. 4 and FIG. 11, the steering system 1 according to the variation of the first embodiment includes a second tooth member 90 instead of the clamping member 44 and the second tooth member 45. The second tooth member 90 is formed by integrating the clamping member 44 and the second tooth member 45, which are included in the first embodiment. That is, the second tooth member 90 is shaped like the second tooth member 45 integrated with the clamping member 44 with the second restriction portion 58 inserted through the through-hole 45A.

As seen in FIG. 11, the second tooth member 90 includes the main body portion 60, the pair of protruding portions 61, the pair of second tooth rows 63L, the second restriction portion 58, and the boss portion 59. In the second tooth member 90, a through-hole 90A is formed which penetrates the second tooth member 90 in the lateral direction Y. The insertion shaft 40 is inserted through the through-hole 90A so as to have play in the through-hole 90A. The second restriction portion 58 is inserted from the left side Y2 through the space 46A in the elastic member 46 and the linear slot 52 in the first tooth member 43.

The right side surface 60B of the main body portion 60 lies at the left side Y2 of the peripheral portions 32A of the left-side-Y2 side plate 30 such that the support portions 49 of the first tooth member 43 and the deformation portions 65 of the elastic member 46 are sandwiched between the right side surface 60B of the main body portion 60 and the peripheral portions 32A of the left-side-Y2 side plate 30. The cam protrusion 44C is formed on a left side surface of the main body portion 60. The second tooth member 90 moves toward the right side Y1 in accordance with an operation of the operation member 41. Consequently, the peripheral portions 32A of the left-side-Y2 side plate 30 are pressed by the right side surface 60B of the main body portion 60 via the deformation portions 65 of the elastic member 46 and the support portions 49 of the first tooth member 43. As described above, the right side surface 60B of the main body portion 60 constitutes a pressing surface.

The variation produces effects similar to the effects of the first embodiment. In the steering system 1 in the variation, movement of the second tooth member 90 during the tilt adjustment is guided through the linear slot 52 in the first tooth member 43. Thus, a dimensional variation involved in the meshing between each first tooth row 51L and the corresponding second tooth row 63L is the sum of variations in the dimensions of the first tooth member 43 and the second tooth member 90, in other words, the sum of the variations in the dimensions of the two components. Therefore, the steering system 1 in the first embodiment enables the first tooth row 51L and the second tooth row 63L to mesh with each other more accurately than the steering system in the comparative example described above. This further increases the tilt holding force.

Figure 12:
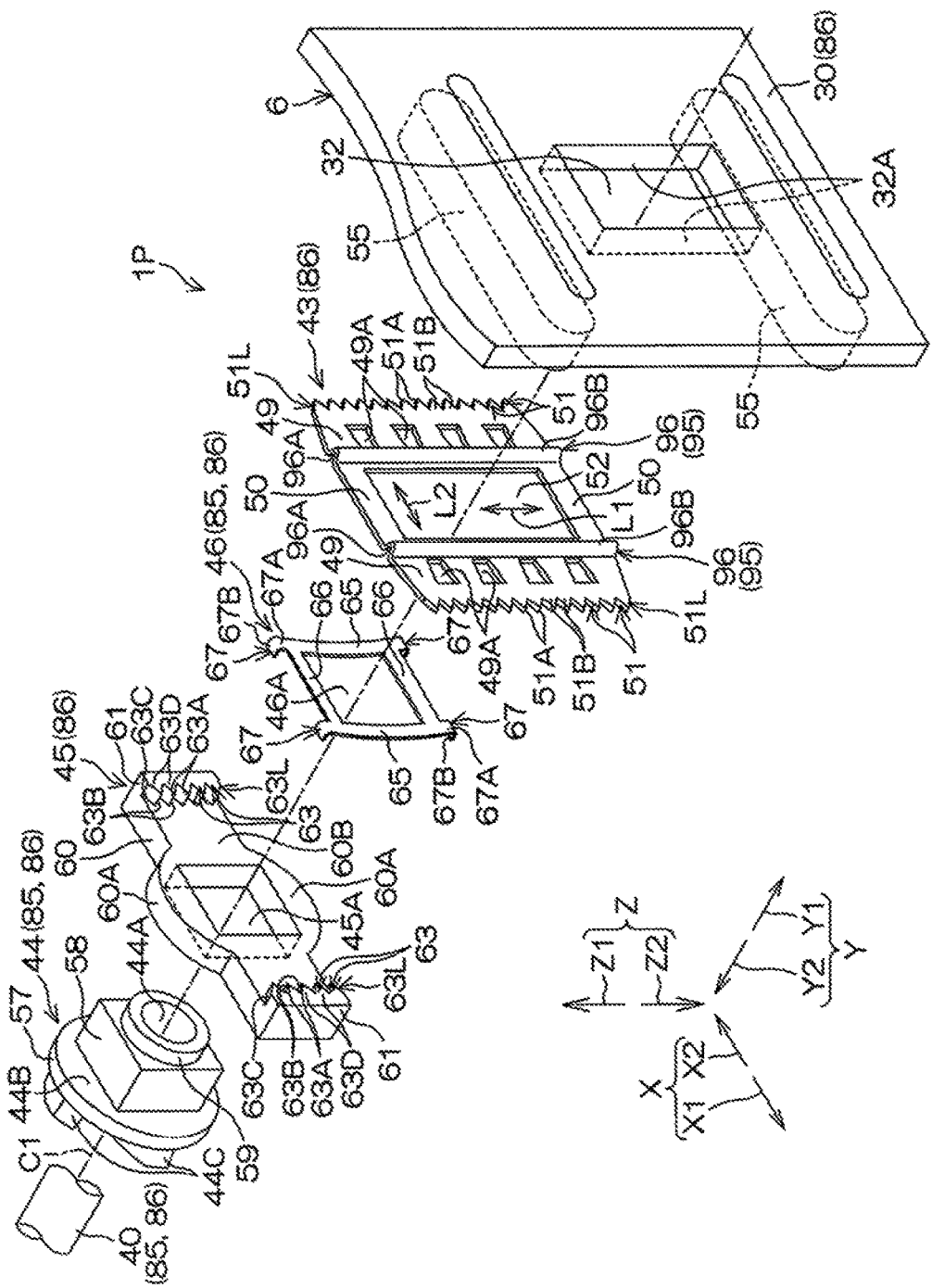
FIG. 12 is an exploded perspective view of members located around a left side plate of an upper bracket of a steering system according to a second embodiment of the invention.
Figure 13:
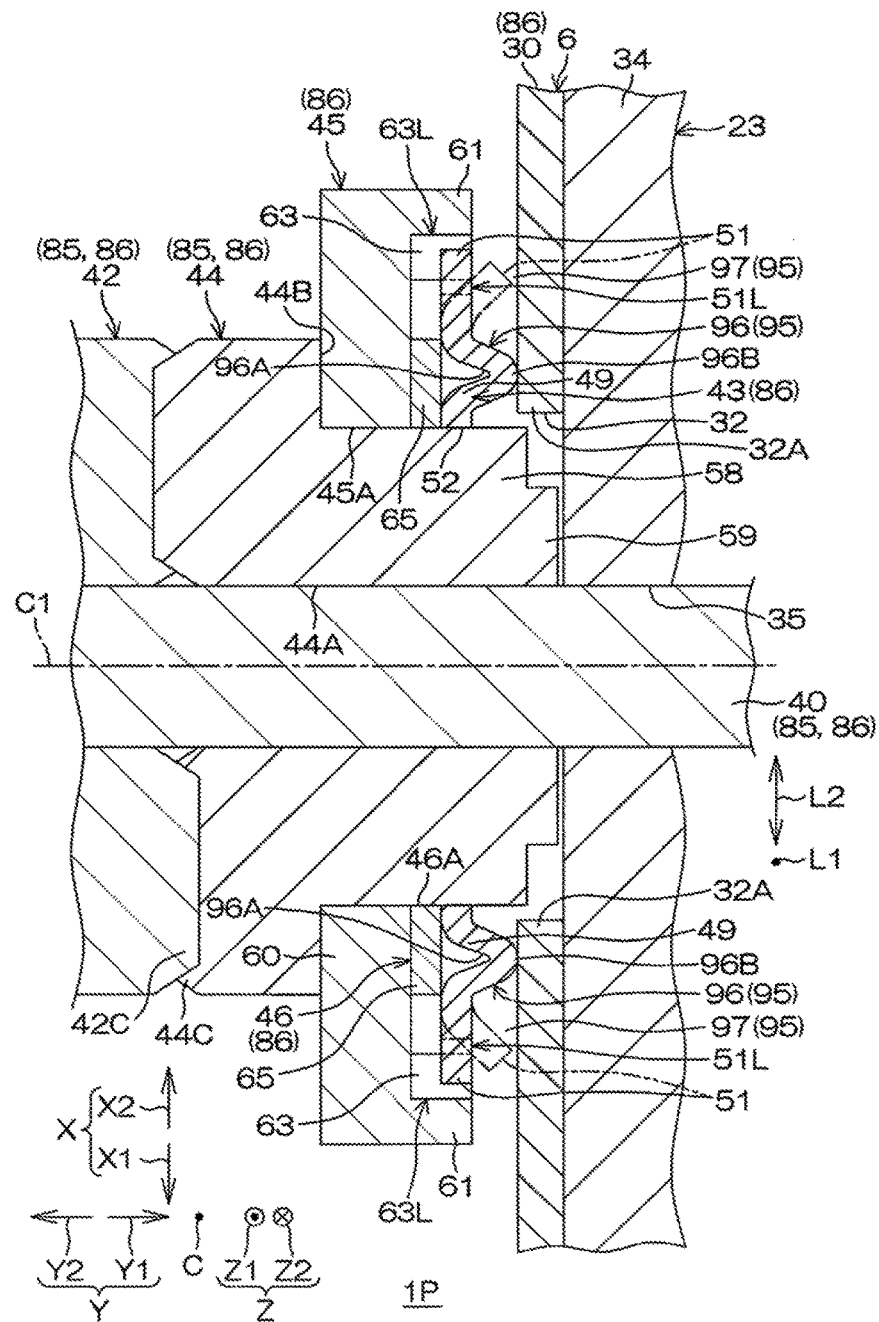
FIG. 13 is a schematic sectional view of a periphery of the left side plate of the upper bracket according to the second embodiment, taken along a plane perpendicular to a first linear direction.

A second embodiment of the invention will be described below. FIG. 12 is an exploded perspective view of members located around the left-side-Y2 side plate 30 of the upper bracket 6 in a steering system 1P according to the second embodiment of the invention. FIG. 13 is a schematic sectional view of a periphery of the left-side-Y2 side plate 30 of the upper bracket 6, and is taken along a plane perpendicular to the first linear direction L1. Members in FIG. 12, FIG. 13, and FIGS. 14 to 17 described below which are the same as those described above are denoted by the same reference numerals, and description thereof will be omitted.

As seen in FIG. 12, the steering system 1P according to the second embodiment is mainly different from the steering system 1 according to the first embodiment in that the steering system 1P includes a deflection suppressing structure 95 included in the first tooth member 43 to restrain the first tooth member 43 from being deflected such that opposite ends of the first tooth member 43 in the first linear direction L1 approach each other. Regardless of whether or not the deflection suppressing structure 95 is present, the first tooth member 43 is elastically deformable in the lateral direction Y in such a manner as to tilt the first tooth rows 51L toward the right side Y1.

The deflection suppressing structure 95 includes, for example, a pair of ribs 96 extending in the first linear direction L1. The ribs 96 protrude toward the right side Y1. The ribs 96 are shaped generally like semicircular arcs as viewed in the first linear direction L1 (see FIG. 13). The ribs 96 are provided on the first tooth member 43 by being integrated with the first tooth member 43. Unlike in the second embodiment, a pair of ribs 96 provided separately from the first tooth member 43 may be fixed to the first tooth member 43.

Each of the ribs 96 is positioned between the corresponding first tooth row 51L and the linear slot 52. More specifically, each of the ribs 96 is positioned between the linear slot 52 and a corresponding set of the holes 49A. In a part of each support portion 49 where the rib 96 is provided, a recess 96A is formed which is formed by deflecting a left side surface of the first tooth member 43 toward the right side Y1. The number of the ribs 96 is not necessarily two. One rib 96 or three or more ribs 96 may be provided.

As seen in FIG. 13, in the locked state, a right end 96B of each rib 96 that is a protruding end thereof is in contact with the left-side-Y2 side plate 30 of the upper bracket 6. In this state, the pressing surface 44B of the clamping member 44 presses the left-side-Y2 side plate 30 via the main body portion 60 of the second tooth member 45, the deformation portions 65 of the elastic member 46, and the ribs 96 of the first tooth member 43. A space between the left-side-Y2 side plate 30 and the first tooth rows 51L of the first tooth member 43 is referred to as a permission space 97.

In the tooth-on-tooth state, the first tooth member 43 is elastically deformed such that the right ends 96B of the ribs 96 in contact with the left-side-Y2 side plate 30 serve as supports. Consequently, the first teeth 51 in a part of each first tooth row 51L which has ridden onto the corresponding second tooth row 63L are tilted toward the right side Y1 (see long dashed double-short dashed lines in FIG. 13). The tips of the first teeth 51 move toward the right side Y1 and are housed in the permission space 97 without interfering with the left-side-Y2 side plate 30. As described above, the deflection suppressing structure 95 has the permission space 97, which permits the first tooth rows 51L to be tilted toward the right side Y1 between the first tooth member 43 and the left-side-Y2 side plate 30.

When, in the locked state, an attempt is made to move the steering member 11 up or down or when the driver collides against the steering member 11 at the time of the secondary collision, loads may be transmitted from the steering member 11 to the first tooth member 43 via the steering shaft 3, the column jacket 4, the insertion shaft 40, the clamping member 44, and the second tooth member 45. The loads may have excess components in the first linear direction L1 that may deflect the first tooth member 43, the movement of which in the first linear direction L1 with respect to the left-side-Y2 side plate 30 is restricted.

In the second embodiment, the first tooth member 43 is restrained by the deflection suppressing structure 95 from being deflected such that the opposite ends of the first tooth member 43 in the first linear direction L1 approach each other. Thus, even when a load having an excess component in the first linear direction L1 is imposed on the first tooth member 43, the first tooth member 43 is restrained from being quickly bent, that is, from being buckled. The permission space 97 permits the first tooth rows 51L to tilt toward the right side Y1 between the first tooth member 43 and the left-side-Y2 side plate of the upper bracket 6. This eliminates the need to provide the side plate 30 having a configuration adapted to avoid interference with the first teeth 51 tilted toward the right side Y1 (for example, the recessed portions 56, 78 in the embodiment described with reference to FIGS. 1 to 11). Therefore, machining of the upper bracket 6 is facilitated, reducing costs. Since the need to provide the side plate 30 having the recessed portions 56, 78 is eliminated, it is possible to reduce the width (thickness) of the side plate 30 in the lateral direction Y.

The second embodiment produces effects similar to the effects of the first embodiment. That is, the common first tooth member 43 and the common second tooth member 45 can be applied even to a plurality of vehicle types with different curvatures of the trajectory K. Thus, the common first tooth member 43 and the common second tooth member 45 can be used for various applications. The first tooth member 43 is provided with the holes 49A serving as rigidity reducing portions. Thus, when each second tooth row 63L rides onto the corresponding first tooth row 51L, the first tooth member 43 is elastically deformed to allow the first tooth rows 51L (specifically, the first teeth 51 in a part of the first tooth row 51L that has ridden onto the second tooth row 63L) to be easily tilted toward the right side Y1.

The first teeth 51 can be meshed with the second teeth 63 in the lateral direction Y in which the tooth traces of the first teeth 51 and the second teeth 63 extend. FIG. 12 depicts only the members located around the left-side-Y2 side plate 30. However, a similar deflection suppressing structure 95 may be provided on the first tooth member 71 disposed around the left-side-Y2 side plate 30. Note that the configuration of the right-side-Y1 deflection suppressing structure 95 is obtained by moving the left-side-Y2 deflection suppressing structure 95 to the right side Y1 and inverting only the lateral orientation of the deflection suppressing structure 95.

Figure 14:
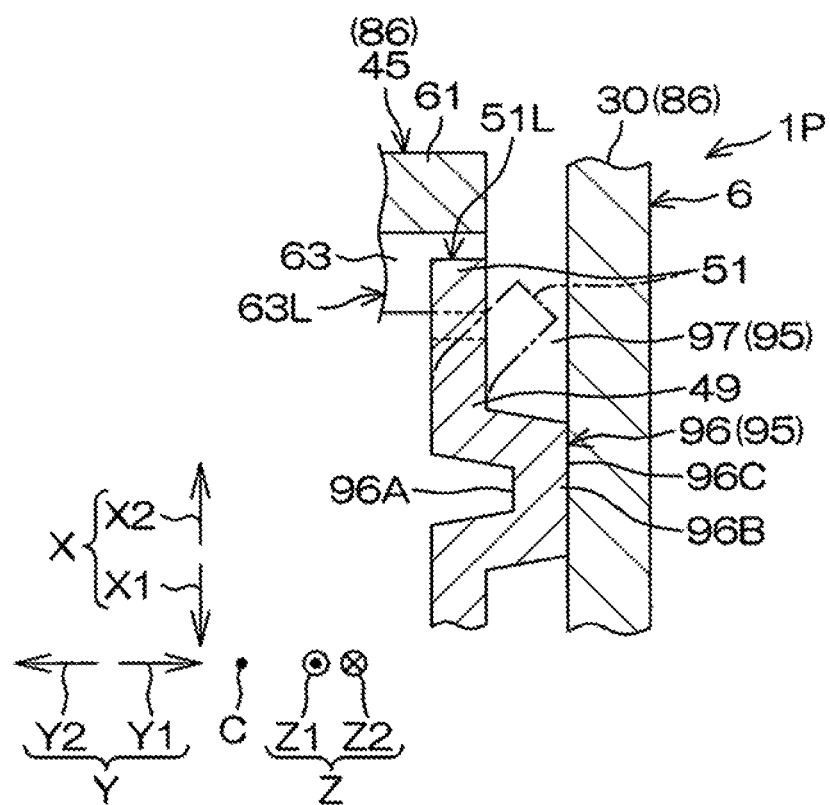
FIG. 14 is a schematic sectional view of a periphery of a deflection suppressing structure according to a first variation of the second embodiment.

FIG. 14 is a schematic sectional view of a periphery of the deflection suppressing structure 95 according to a first variation of the second embodiment. The ribs 96 in the second embodiment are shaped generally like semicircular arcs as viewed in the first linear direction L1. However, the ribs 96 may be shaped generally like trapezoids as viewed in the first linear direction L1 as in the first variation depicted in FIG. 14. Each of the ribs 96 has a flat surface 96C at the right end 96B of the rib 96. Thus, when, in the locked state, the ribs 96 come into contact with the left-side-Y2 side plate 30 of the upper bracket 6, the entire flat surface 96C of each rib 96 can receive a reaction force from the side plate 30 to which the rib 96 is subjected. This enables a reduction in pressure to which the rib 96 is subjected.

Figure 15A:
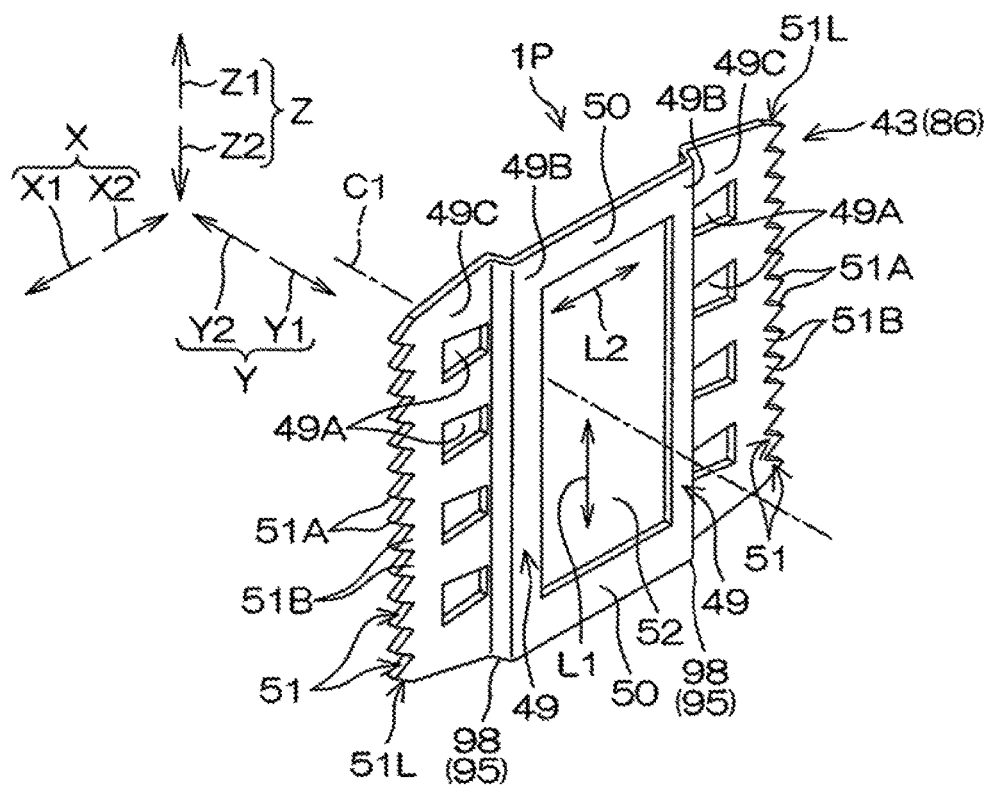
FIG. 15A is a schematic perspective view of a first tooth member according to a second variation of the second embodiment.
Figure 15B:
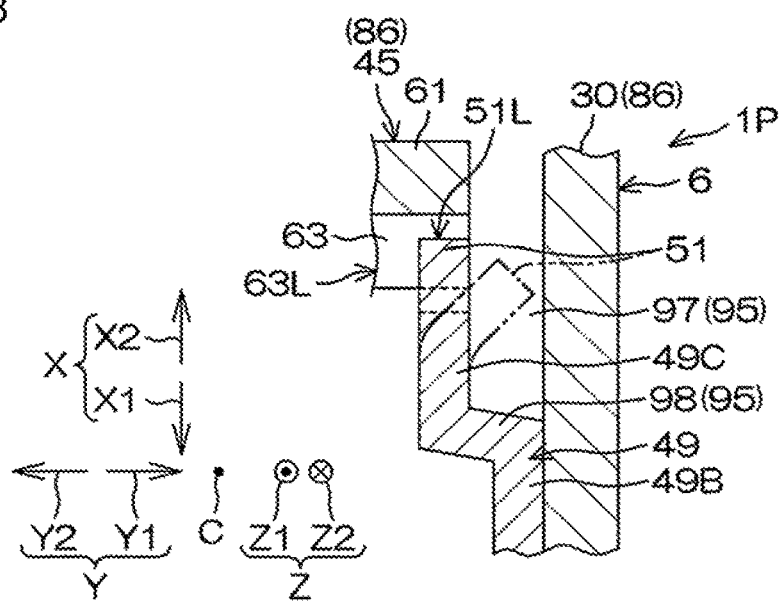
FIG. 15B is a schematic sectional view of the periphery of the deflection suppressing structure according to the first variation of the second embodiment.

FIG. 15A is a schematic perspective view of the first tooth member 43 according to a second variation of the second embodiment. FIG. 15B is a schematic sectional view of a periphery of the deflection suppressing structure 95 according to the second variation of the second embodiment. As seen in FIG. 15A and FIG. 15B, the deflection suppressing structure 95 of the first tooth member 43 according to the second embodiment includes a pair of steps 98 provided all along the respective support portions 49 in the first linear direction L1, instead of the ribs 96 in the first variation.

In the first tooth member 43 in the second variation, since the support portions 49 are provided with the steps 98, a peripheral portion of the linear slot 52 protrudes toward the right side Y1 with respect to the first tooth rows 51L.

Specifically, each of the steps 98 is provided between the linear slot 52 and the corresponding set of the holes 49A. Each support portion 49 includes a right portion 49B and a left portion 49C. The right portions 49B are disposed on the rear side and on the front side of the respective steps 98. Each of the coupling portions 50 couples the right portions 49B together. Each of the first tooth rows 51L is supported by the left portion 49C of the corresponding support portion 49. Each first tooth row 51L is disposed on the left side Y2 with respect to the right portion 49B of the corresponding support portion 49 and to the coupling portions 50.

As seen in FIG. 15B, in the locked state, the right portions 49B of the support portions 49 are in contact with the left-side-Y2 side plate 30 of the upper bracket 6. In this state, the pressing surface 44B (see FIG. 13) of the clamping member 44 in the second variation presses the left-side-Y2 side plate 30 via the right portions 49B of the support portions 49 instead of the ribs 96 in the second embodiment. Thus, permission spaces 97 are formed between the respective first tooth rows 51L of the first tooth member 43 and the left-side-Y2 side plate 30. In the tooth-on-tooth state, the first tooth member 43 is elastically deformed using, as supports, boundary portions each between the right portion 49B of the corresponding support portion 49 and the corresponding step 98. The variation depicted in FIG. 11 may also be applied to the second embodiment.

Figure 16:
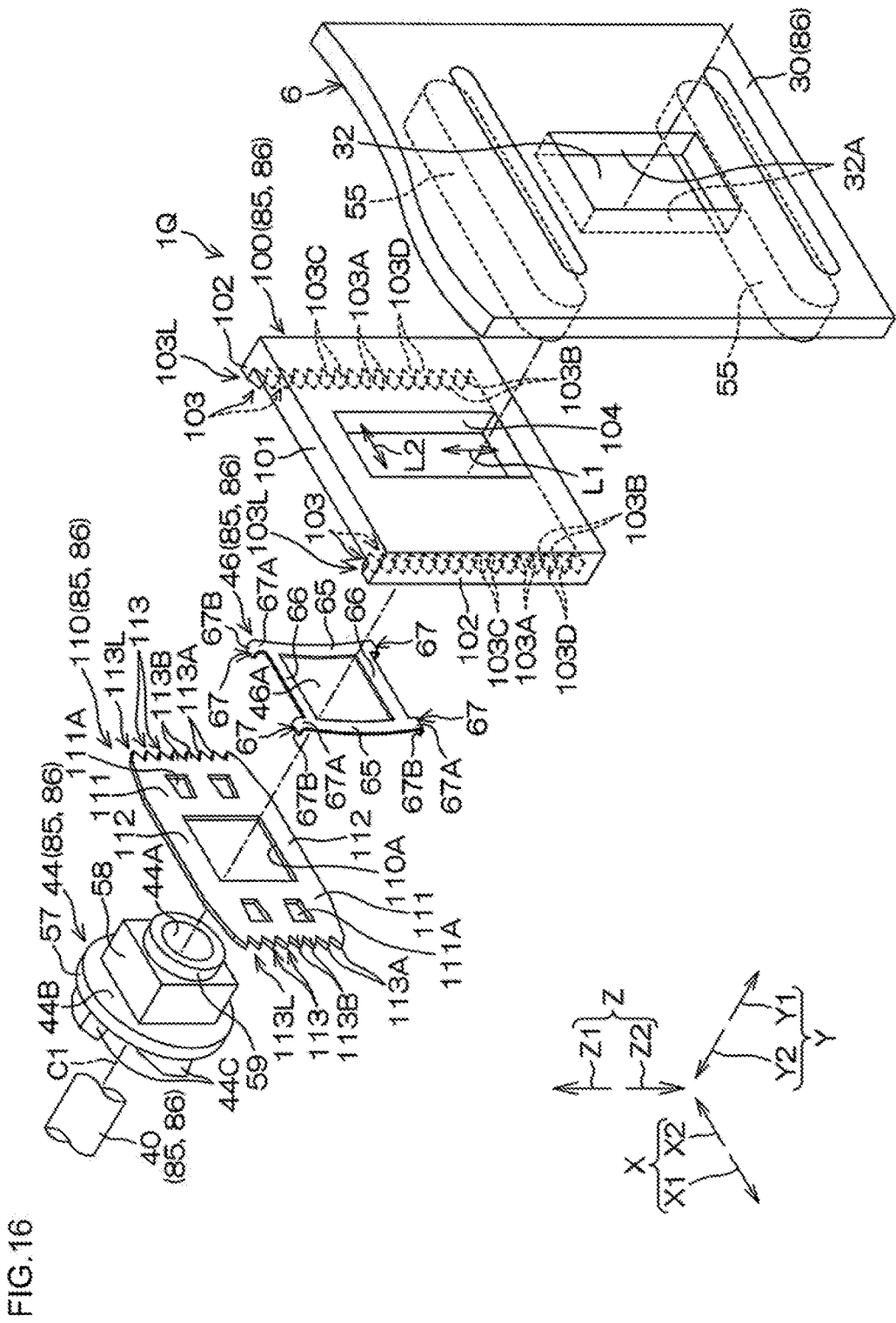
FIG. 16 is an exploded perspective view of members located around a left side plate of an upper bracket of a steering system according to a third embodiment of the invention.
Figure 17:
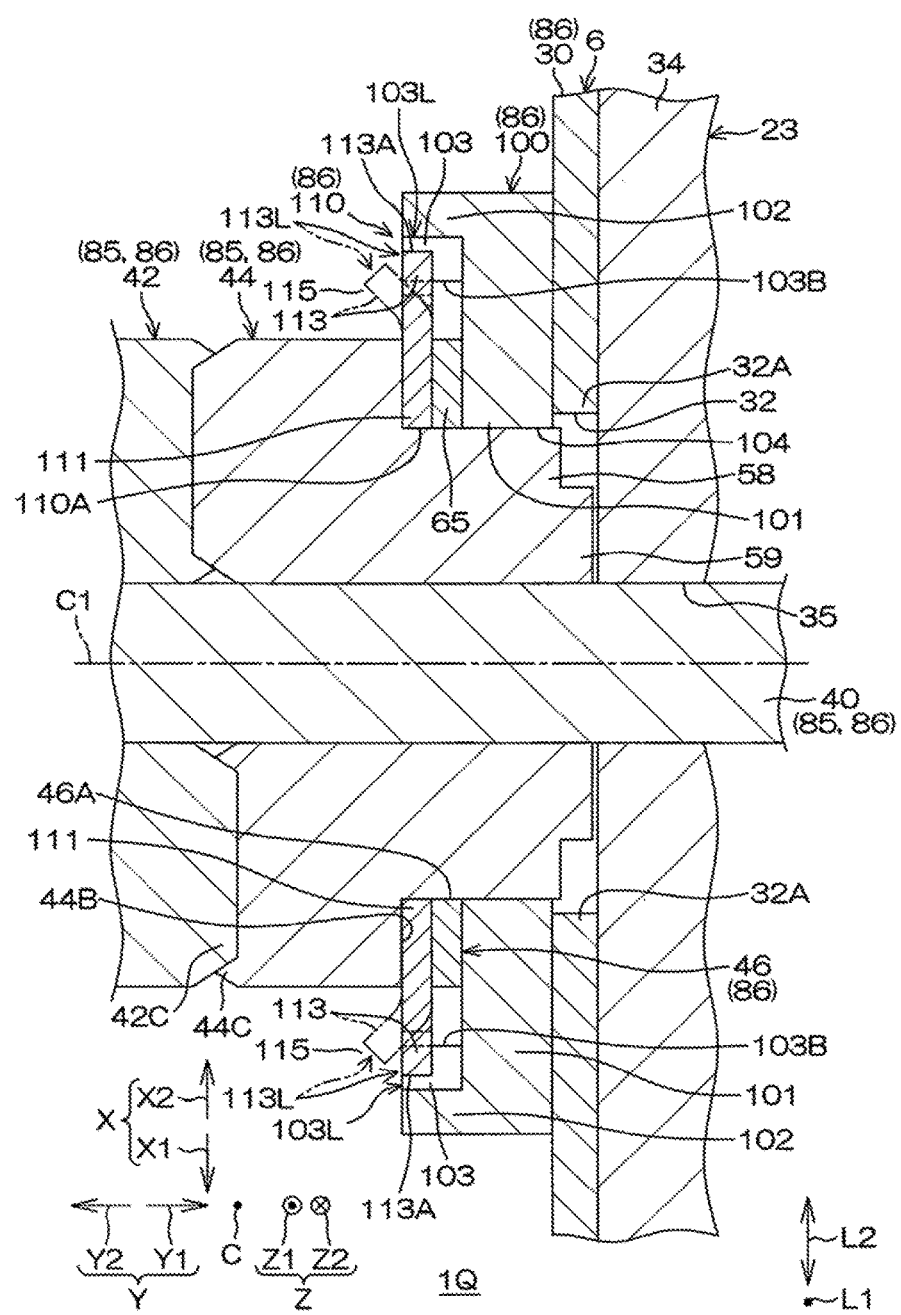
FIG. 17 is a schematic sectional view of a periphery of the left side plate of the upper bracket according to the third embodiment, taken along a plane perpendicular to the first linear direction.

A third embodiment of the invention will be described below. FIG. 16 is an exploded perspective view of members located around the left-side-Y2 side plate 30 of the upper bracket 6 in a steering system 1Q according to the third embodiment of the invention. FIG. 17 is a schematic sectional view depicting a periphery of the left-side-Y2 side plate 30 of the upper bracket 6 and taken along a plane perpendicular to the first linear direction L1.

The steering system 1Q in the third embodiment is mainly different from the steering system 1 according to the first embodiment in that the steering system 1Q includes a first tooth member 100 instead of the first tooth member 43 and includes a second tooth member 110 instead of the second tooth member 45. Specifically, the first tooth member 100 is, for example, a sintered compact formed of metal. The first tooth member 100 is shaped, for example, generally like a rectangle as viewed in the lateral direction Y. The first tooth member 100 integrally includes a main body portion 101, a pair of protruding portions 102, and a pair of first tooth rows 103L.

The main body portion 101 is shaped generally like a rectangle as viewed in the lateral direction Y. The protruding portions 102 are shaped generally like rectangles that are longitudinal in the up-down direction Z as viewed in the lateral direction Y. Each of the protruding portions 102 protrudes from a corresponding one of the opposite ends of the main body portion 101 in the axial direction X, toward the left side Y2. In the first tooth member 100, a linear slot 104 is formed which penetrates the first tooth member 100 in the lateral direction Y. The linear slot 104 extends in the first linear direction L1. In the third embodiment, the first linear direction L1 is parallel to the up-down direction Z as in the first embodiment. The linear slot 104 is formed substantially in the center of the main body portion 101 in the axial direction X and in the up-down direction Z. The insertion shaft 40 is inserted through the linear slot 104.

Each of the first tooth rows 103L includes first teeth 103 aligned along the first linear direction L1 (that is also the up-down direction Z). The first tooth rows 103L are disposed away from each other in the axial direction X by being provided on the respective protruding portions 102. The rear-side-X1 first tooth row 103L protrudes from a front surface of the rear-side-X1 protruding portion 102 toward the front side X2, with tooth tips 103A of the first teeth 103 directed toward the front side X2. The front-side-X2 first tooth row 103L protrudes from a rear surface of the front-side-X2 protruding portion 102 toward the rear side X1, with the tooth tips 103A of the first teeth 103 directed toward the rear side X1.

The tooth tips 103A of the first teeth 103 of each first tooth row 103L each have a tooth trace 103B extending in the lateral direction Y. In each of the first tooth rows 103L, right ends 103C of the first teeth 103 that are ends of the first teeth 103 near the main body portion 101 are fixed to the left side surface of the main body portion 101. In each of the first tooth rows 103L, dedendum portions 103D of the first teeth 103 are fixed to the protruding portion 102. As described above, each of the first teeth 103 is fixed at two positions, that is, at the dedendum portion 103D and at the right end 103C, and thus has a high strength.

The first tooth member 100 is disposed between the first restriction portions 55. Movement of the first tooth member 100 in the first linear direction L1 is restricted by the first restriction portions 55. Rotation of the first tooth member 100 around the insertion shaft 40 is restricted by the first restriction portions 55. The first tooth member 100 is supported by the left-side-Y2 side plate 30 via the first restriction portions 55. Consequently, the first tooth member 100 can move in the second linear direction L2 with respect to the left-side-Y2 side plate 30 between the first restriction portions 55. The first restriction portions 55 also function as a guide portion that guides movement of the first tooth member 100 in the second linear direction L2.

The second tooth member 110 is, for example, a metal plate that is elastically deformable in the lateral direction Y. An external contour of the second tooth member 110 is shaped generally like a quadrangle that is longitudinal in the axial direction X as viewed in the lateral direction Y. The second tooth member 110 integrally includes a pair of support portions 111, a pair of coupling portions 112, and a pair of second tooth rows 113L.

The support portions 111 are disposed away from each other in the axial direction X. In each of the support portions 111, a plurality of holes 111A may be formed which serves as rigidity reducing portions that reduce the rigidity of the second tooth member 110. The holes 111A are shaped like the holes 49A in the first embodiment. The coupling portions 112 are disposed away from each other in the up-down direction Z. The coupling portions 112 couple the support portions 111 together.

Each of the second tooth rows 113L includes a plurality of second teeth 113 shaped generally like triangles and aligned in the first linear direction L1 (that is also the up-down direction Z). The width of each second tooth row 113L in the first linear direction L1 is smaller than the width of each first tooth row 103L in the first linear direction L1.

The second teeth 113 in each second tooth row 113L are fewer than the first teeth 103 in each first tooth row 103L.

The front-side-X2 second tooth row 113L is provided at a front edge of the front-side-X2 support portion 111. The rear-side-X1 second tooth row 113L is provided at a rear edge of the rear-side-X1 support portion 111. The second teeth 113 of the front-side-X2 second tooth row 113L protrude from the front-side-X2 support portion 111 toward the front side X2. The second teeth 113 of the rear-side-X1 second tooth row 113L protrude from the rear-side-X1 support portion 111 toward the rear side X1.

Each of the second teeth 113 of each second tooth row 113L has, as a tip, a tooth trace 113A extending in the lateral direction Y. Dedendum portions 113B of the second teeth 113 are supported by and integrated with support portions 111. The second tooth member 110 is elastically deformable in the lateral direction Y as described above. However, in the second tooth member 110, at least the second tooth rows 113L may be elastically deformable in the lateral direction Y.

In the second tooth member 110, a through-hole 110A is formed which penetrates the second tooth member 110 in the lateral direction Y. The through-hole 110A is shaped generally like a quadrangle as viewed in the lateral direction Y. The through-hole 110A is a space surrounded by the support portions 111 and the coupling portions 112. The insertion shaft 40 and the second restriction portion 58 are inserted through the through-hole 110A. The support portions 111 are located at the right side Y1 of the plate portion 57 of the clamping member 44 so as to be adjacent to the plate portion 57.

The elastic member 46 is disposed between the second tooth member 110 and the first tooth member 100 in the lateral direction Y. Specifically, the support portions 111 of the second tooth member 110 lie at the left side Y2 of the deformation portions 65 of the elastic member 46 so as to face the deformation portions 65. The support portions 111 lie at the left side Y2 of the main body portion 101 of the first tooth member1 100 so as to face the main body portion 101. The second restriction portion 58 of the clamping member 44 is inserted through the through-hole 110A in the second tooth member 110, the space 46A in the elastic member 46, and the linear slot 104 in the first tooth member 100 in this order from the left side Y2. As described above, the insertion shaft 40 is inserted through the through-hole 44A in the clamping member 44. Consequently, the second tooth member 110 and the elastic member 46 are supported by the insertion shaft 40 via the clamping member 44. The through-hole 110A, the space 46A, and the second restriction portion 58 are each shaped generally like a quadrangle as viewed in the lateral direction Y. Thus, the second tooth member 110 and the elastic member 46 are prevented from running idly with respect to the second restriction portion 58. The second restriction portion 58 is coupled to the second tooth member 110.

A clearance between the second restriction portion 58 and each of the opposite ends of the linear slot 104 in the axial direction X is slight and only enough to allow the second restriction portion 58 to move in the up-down direction Z along and relative to the linear slot 104. Thus, the second restriction portion 58 is movable in the first linear direction L1 with respect to the linear slot 104 and is immovable in the second linear direction L2 with respect to the linear slot 104. This restricts movement of the second tooth member 110 in the second linear direction L2 with respect to the first tooth member 100.

Idle running of the clamping member 44 with respect to the first tooth member 100 is prevented by contact between opposite end surfaces of the second restriction portion 58 in the axial direction X and the opposite ends of the linear slot 104 in the axial direction X. As described above, rotation of the first tooth member 100 around the insertion shaft 40 is restricted by the first restriction portions 55. This restricts rotation, around the insertion shaft 40, of the clamping member 44 prevented from running idly with respect to the first tooth member 100, the second tooth member 110 prevented from running idly with respect to the second restriction portion 58 of the clamping member 44, and the elastic member 46.

Now, with reference to FIG. 17, operations of the steering system 1Q will be described. An operation in which the side plates 30 and the clamped portions 34 are clamped by the clamping mechanism 85 is substantially similar to the corresponding operation in the first embodiment. Description of the operation is thus omitted. An operation for meshing between the first tooth member 100 and the second tooth member 110 will be described in detail. When the second tooth member 110 moves toward the right side Y1 in accordance with an operation of the operation member 41 (see FIG. 3), if the first teeth 103 of the first tooth rows 103L and the second teeth 113 of the second tooth rows 113L are in a positional relation in which the first teeth 103 and the second teeth 113 do not overlap as viewed from the left side Y2, the positional relation changes when the operation of the operation member 41 is completed. That is, the first teeth 103 and the second teeth 113 are alternately aligned in the tilt direction C, and the pressing surface 44B of the clamping member 44 presses the peripheral portions 32A of the insertion hole 32 in the left-side-Y2 side plates 30. Therefore, the steering system 1Q can reach the locked state without being obstructed by the first teeth 103 and the second teeth 113. At this time, the first teeth 103 mesh with the second teeth 113 in the direction (corresponding to the lateral direction Y) in which the tooth traces of the first teeth 103 and the second teeth 113 extend.

On the other hand, when the second tooth member 110 moves toward the right side Y1, if the first teeth 103 of the first tooth rows 103L and the second teeth 113 of the second tooth rows 113L are in a positional relation in which the first teeth 103 and the second teeth 113 overlap as viewed from the left side Y2, the first tooth rows 103L ride onto the second tooth rows 113L before the pressing surface 44B of the clamping member 44 presses the peripheral portions 32A of the insertion hole 32 in the left-side-Y2 side plate 30. This results in the tooth-on-tooth state.

In the tooth-on-tooth state, the second tooth member 110 is elastically deformed such that the second teeth 113 of the second tooth rows 113L are tilted toward the left side Y2. Specifically, the second teeth 113 of the second tooth rows 113L having ridden onto the first tooth rows 103L are elastically deformed and deflected toward the left side Y2 and are positioned in spaces 115 at respective opposite sides of the clamping member 44 in the axial direction X. Thus, even in the tooth-on-tooth state, the second teeth 113 are positioned in the spaces 115 to allow the clamping member 44 to move toward the right side Y1 without obstruction by the first tooth rows 103L and the second tooth rows 113L. Consequently, even in the tooth-on-tooth state, the pressing surface 44B of the clamping member 44 can press the peripheral portions 32A of the insertion hole 32 in the left-side-Y2 side plate 30 via the deformation portions 65 of the elastic member 46 and the main body portion 101 of the first tooth member 100. Therefore, the operation member 41

(see FIG. 3) does not become non-rotatable during operation, so that the steering system 1Q can reach the locked state.

As described above, the steering system 1Q can be brought into the locked state regardless of the positional relation between the first tooth rows 103L and the respective second tooth rows 113L. That is, what is called stepless lock can be achieved in which the steering system 1Q can be brought into the locked state regardless of whichever tilt adjustment position is set. In the third embodiment, the second tooth rows 113L are elastically deformable. If the first tooth rows 103L fail to mesh with and ride onto the second tooth rows 113L, the second tooth rows 113L can be elastically deformed and deflected toward the left side Y2 (opposite side to the side plate 30 of the upper bracket 6). Consequently, even upon failing to mesh with each other, the first tooth rows 103L and the second tooth rows 113L can be brought into pressure contact with each other. The pressing surface 44B of the clamping member 44 can press the left-side-Y2 side plate by transmitting a force to the left-side-Y2 side plate 30 via the support portions 111 of the second tooth member 110, the deformation portions 65 of the elastic member 46, and the main body portion 101 of the first tooth member 100. Therefore, the column jacket 4 can be locked in position in the tilt direction C.

The first tooth member 100 is a sintered compact that is unlikely to be elastically deformed (unlikely to be deflected). Therefore, even when a load having an excess component in the first linear direction L1 is imposed on the second tooth member 110, the second tooth member 110 is restrained from being quickly bent, that is, from being buckled. The first tooth member 100 is not limited to the sintered compact but may be any member that is unlikely to be elastically deformed (unlikely to be deflected).

Tilting of the second tooth rows 113L toward the right side Y1 is permitted by the spaces 115 at the respective opposite sides of the clamping member 44 in the axial direction X. This eliminates the need to provide the side plate 30 having a configuration adapted to avoid interference with the second teeth 113 tilted toward the left side Y2. The side plate 30 also need not be provided with the recessed portions 56, 78 in the embodiment described with reference to FIGS. 1 to 11. Therefore, machining of the upper bracket 6 is facilitated, reducing costs. Since the need to provide the side plate 30 having the recessed portions 56, 78 and the like is eliminated, it is possible to reduce the width (thickness) of the side plate 30 in the lateral direction Y.

The third embodiment produces effects similar to the effects of the first embodiment. That is, the common first tooth member 100) and the common second tooth member 110 can be applied even to a plurality of vehicle types with different curvatures of the trajectory K. Thus, the common first tooth member 100 and the common second tooth member 110 can be used for various applications. The second tooth member 110 is provided with the holes 111A serving as rigidity reducing portions. Thus, when each first tooth row 103L rides onto the corresponding second tooth row 113L, the second tooth member 110 is elastically deformed to allow the second tooth rows 113L (specifically, the second teeth 113 of the second tooth row 113L onto which the first tooth row 103L has ridden) to be easily tilted toward the left side Y2.

The first teeth 51 can be meshed with the second teeth 63 in the lateral direction Y in which the tooth traces of the first teeth 51 and the second teeth 63 extend. FIG. 16 and FIG. 17 depict only the members located around the left-side-Y2 side plate 30. However, a configuration similar to the configuration of the first tooth member 100 may be applied to the first tooth member 71 disposed around the right-side-Y1 side plate 30. A configuration similar to the configuration of the second tooth member 110 may be applied to the second tooth member 72 disposed around the right-side-Y1 side plate 30. Note that the configurations of the first tooth member 71 and the second tooth member 72 are obtained by moving the first tooth member 100 and the second tooth member 110 to the right side Y1 and inverting only the lateral orientations of the first tooth member 100 and the second tooth member 110.

The invention is not limited to the above-described embodiments, but various changes may be made to the embodiments within the scope of the claims. For example, the first linear direction L1 and the second linear direction L2 need not be orthogonal to each other but may cross each other. The first linear direction L1 need not coincide with the up-down direction Z.

The first tooth rows 51L and the second tooth rows 63L may each include a plurality of teeth each having a tooth trace extending in a direction orthogonal to the direction (lateral direction Y) in which the first tooth rows 51L face the second tooth rows 63L, that is, a plurality of teeth undulating in the lateral direction Y. The rigidity reducing portions are not limited to the holes 49A but may be recesses or cutouts that make the support portions 49 thinner in the lateral direction Y.

The second restriction portion 58 may be omitted from the clamping member 44, and instead, the second tooth member 45 may include the second restriction portion 58. The second restriction portion 58 may be provided separately from the clamping member 44 and the second tooth member 45. Unlike in the above-described embodiments, the steering system 1 may include one of the left-side-Y2 tilt lock mechanism 86 and the right-side-Y1 tilt lock mechanism 87.

The steering system 1 is not limited to a manual steering system in which steering of the steering member 11 is not assisted but may be a column-assist electric power steering system in which steering of the steering member 11 is assisted by an electric motor. The steering system 1 is not limited to the telescopic lock mechanism 83 but may include a telescopic lock mechanism with a different structure. Unlike in the present embodiments, the telescopic lock mechanism 83 may be omitted from the steering system 1.

The steering system 1 may not include the telescopic adjustment function but include only a tilt adjustment function. The lower jacket 23 may be of any configuration as long as the lower jacket 23 is sandwiched between the side plates 30 so that the diameter of the lower jacket 23 is reduced to hold the upper jacket 22. For example, the slit 33 may be closed at a front-side-X2 end thereof. The steering system 1 may be configured to hold the upper jacket 22 without the lower jacket 23.

The tilt lock mechanism 86 and the tilt lock mechanism 87 are also applicable to a steering system 1 of a capsule type having a capsule (not depicted in the drawings) that couples the coupling plate 31 (see FIG. 2) of the upper bracket 6 and the vehicle body 2 (see FIG. 1) together unlike in the above-described embodiments. At the time of the secondary collision, the capsule (not depicted in the drawings) is broken to detach the upper bracket 6 from the vehicle body 2.

The steering systems 1, 1P, 1Q in the above-described embodiments are what is called upper-lever steering systems in which the base end 41A of the operation member 41 is disposed on the upper side Z1 with respect to the upper jacket 22. However, the tilt lock mechanism 86 and the tilt lock mechanism 87 can be applied to what is called lower-lever steering systems in which the base end 41A of the operation member 41 is disposed on the lower side Z2 with respect to the upper jacket 22.

What is claimed is:

1. A steering system comprising:
a steering shaft with a steering member coupled to the steering shaft at one end thereof;
a column jacket that holds the steering shaft and that is enabled to pivot in a tilt direction along a trajectory shaped like a circular arc with a predetermined curvature;
a bracket that supports the column jacket so as to enable the column jacket to pivot and that is fixed to a vehicle body;
an insertion shaft to which an operation member operated to enable and disable movement of the column jacket with respect to the bracket is attached, the insertion shaft extending in a crossing direction that crosses both an axial direction of the steering shaft and the tilt direction and being movable in the tilt direction along with the column jacket;
a first tooth member in which a linear slot extending in a first linear direction that crosses the axial direction and that is orthogonal to the crossing direction is formed, the first tooth member including a first tooth row including a plurality of first teeth aligned along the first linear direction, the first tooth member supported by the bracket so as to be movable in a second linear direction that crosses the first linear direction and that is orthogonal to the crossing direction;
a first restriction portion provided on the bracket to restrict movement of the first tooth member in the first linear direction with respect to the bracket;
a second tooth member including a second tooth row including a plurality of second teeth aligned along the first linear direction, the second tooth member facing the first tooth member in the crossing direction and supported by the insertion shaft, the second tooth member being enabled to move in the crossing direction as a result of an operation of the operation member; and
a second restriction member coupled to the second tooth member and inserted through the linear slot so as to be movable in the first linear direction with respect to the linear slot and to be immovable in the second linear direction with respect to the linear slot, the second restriction member restricting movement of the second tooth member in the second linear direction with respect to the first tooth member.

2. The steering system according to claim 1, wherein the first tooth row is elastically deformable in the crossing direction, and
the bracket is provided with a recessed portion at a position where the recessed portion faces the first tooth row in the crossing direction.

3. The steering system according to claim 2, wherein the first tooth member is provided with a rigidity reducing portion that reduces rigidity of the first tooth member.

4. The steering system according to claim 1, wherein the first teeth and the second teeth each have a tooth trace extending in the crossing direction.

5. The steering system according to claim 1, comprising a deflection suppressing structure provided on the first tooth member to restrain the first tooth member from being deflected such that opposite ends of the first tooth member in the first linear direction approach each other.

6. The steering system according to claim 5, wherein the first teeth of the first tooth member are elastically deformable so as to be tilted in the crossing direction, and
the deflection suppressing structure has a permission space that permits the first teeth to be tilted in the crossing direction between the first tooth member and the bracket.

7. The steering system according to claim 5, wherein the first tooth member is provided with a rigidity reducing portion that reduces rigidity of the first tooth member.

8. The steering system according to claim 5, wherein the first teeth and the second teeth each have a tooth trace extending in the crossing direction.

9. The steering system according to claim 1, wherein the second tooth row is elastically deformable in the crossing direction.

* * * * *